(12) United States Patent
Shmilovich et al.

(10) Patent No.: US 10,005,544 B2
(45) Date of Patent: Jun. 26, 2018

(54) SYSTEM AND METHOD FOR ENHANCING THE HIGH-LIFT PERFORMANCE OF AN AIRCRAFT

(71) Applicant: The Boeing Company, Chicago, IL (US)

(72) Inventors: Arvin Shmilovich, Huntington Beach, CA (US); Yoram Yadlin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 816 days.

(21) Appl. No.: 14/690,377

(22) Filed: Apr. 18, 2015

(65) Prior Publication Data

US 2016/0375987 A1    Dec. 29, 2016

(51) Int. Cl.
| | |
|---|---|
| *B64C 21/04* | (2006.01) |
| *B64C 9/38* | (2006.01) |
| *B64C 9/16* | (2006.01) |
| *B64C 3/18* | (2006.01) |
| *B64C 9/00* | (2006.01) |

(52) U.S. Cl.
CPC .............. *B64C 21/04* (2013.01); *B64C 3/185* (2013.01); *B64C 9/16* (2013.01); *B64C 9/38* (2013.01); *B64C 2009/005* (2013.01); *B64C 2230/04* (2013.01); *B64C 2230/06* (2013.01); *Y02T 50/166* (2013.01); *Y02T 50/32* (2013.01)

(58) Field of Classification Search
CPC ........... B64C 9/16; B64C 9/38; B64C 21/025; B64C 21/04; B64C 21/06; B64C 21/08; B64C 2009/005; B64C 2230/04

USPC .......................................................... 244/207
See application file for complete search history.

(56) References Cited

U.S. PATENT DOCUMENTS

| | | | | | |
|---|---|---|---|---|---|
| 3,093,349 | A | * | 6/1963 | Wagner .................. | B64C 21/025 244/212 |
| 3,259,341 | A | * | 7/1966 | Steidl ..................... | B64C 23/005 244/207 |
| 3,347,495 | A | * | 10/1967 | Eberhardt ............. | B64C 23/005 244/207 |
| 3,447,763 | A | * | 6/1969 | Allcock .................. | B64C 21/04 244/207 |
| 3,658,279 | A | * | 4/1972 | Robertson ............. | B64C 23/005 244/207 |
| 3,920,203 | A | * | 11/1975 | Moorehead ............ | B64C 21/04 244/110 B |
| 3,974,987 | A | * | 8/1976 | Shorr ...................... | B64C 21/04 244/207 |

(Continued)

FOREIGN PATENT DOCUMENTS

DE        102009011662 A1    9/2010

OTHER PUBLICATIONS

European Search Report for EP16165725, dated Aug. 22, 2016.
(Continued)

*Primary Examiner* — Richard R Green
*Assistant Examiner* — Brady W Frazier

(57) ABSTRACT

A drag reduction system for an aircraft may include an air ejector having an ejection port located between an aft portion of an airfoil main element and a forward portion of a trailing edge device. The air ejector may be configured to discharge an air jet from the ejection port in such a manner that the air jet passes over the upper surface of the trailing edge device.

20 Claims, 20 Drawing Sheets

(56) References Cited

U.S. PATENT DOCUMENTS

| | | | | | |
|---|---|---|---|---|---|
| 4,157,161 | A | * | 6/1979 | Bauer | B05B 1/08 |
| | | | | | 137/830 |
| 4,674,716 | A | * | 6/1987 | Moore | B64C 3/50 |
| | | | | | 244/207 |
| 5,167,383 | A | * | 12/1992 | Nozaki | B64C 9/20 |
| | | | | | 244/12.5 |
| 5,758,823 | A | * | 6/1998 | Glezer | B64C 21/08 |
| | | | | | 239/11 |
| 8,382,043 | B1 | * | 2/2013 | Raghu | B64C 21/04 |
| | | | | | 244/1 N |
| 9,333,517 | B2 | * | 5/2016 | Koklu | B05B 1/08 |
| 2006/0000943 | A1 | | 1/2006 | Ouellette et al. | |
| 2006/0102801 | A1 | | 5/2006 | Manley | |
| 2012/0043428 | A1 | * | 2/2012 | Goelling | B64C 9/18 |
| | | | | | 244/208 |
| 2013/0026300 | A1 | * | 1/2013 | Golling | B64C 9/16 |
| | | | | | 244/203 |
| 2013/0306788 | A1 | * | 11/2013 | Criado | B64C 23/005 |
| | | | | | 244/36 |
| 2014/0119878 | A1 | | 5/2014 | Shmilovich et al. | |

OTHER PUBLICATIONS wiki-cleantech.com, "Synthetic Jet actuator for active flow control on wind turbine blades—Wiki Cleantech," retrieved Feb. 25, 2015.
Joe et al., "Entrainment Enhancement of a Supersonic Jet for Advanced Ejectors," Presented at 2nd DOE/ORNL Heat Pump Conference: Research and Development on the Heat Pump for Space Conditioning Applications, Washington, D.C., Apr. 17, 1988.

\* cited by examiner

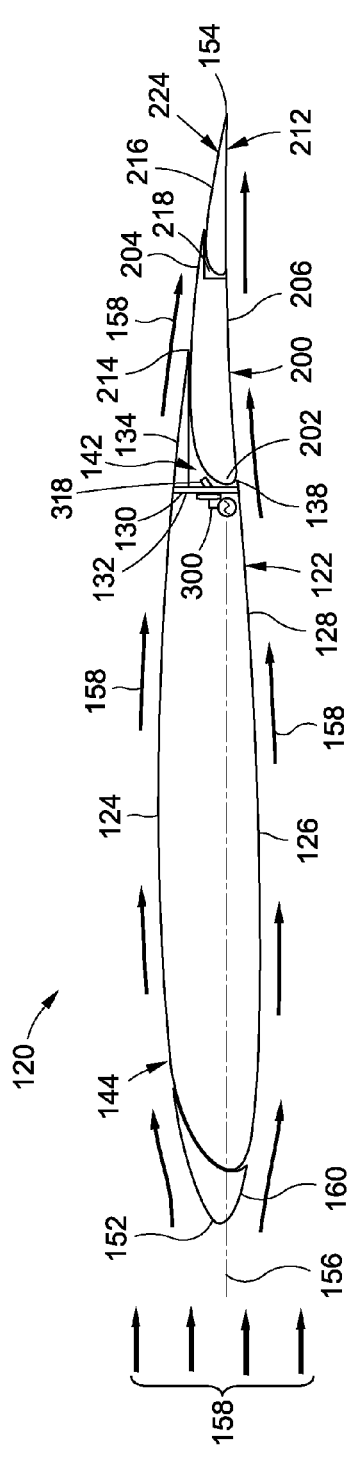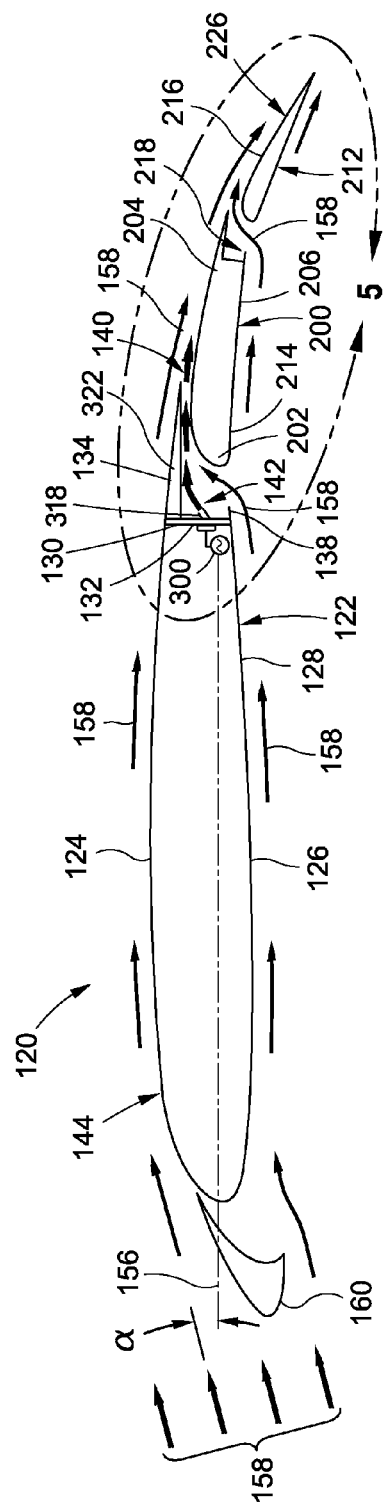

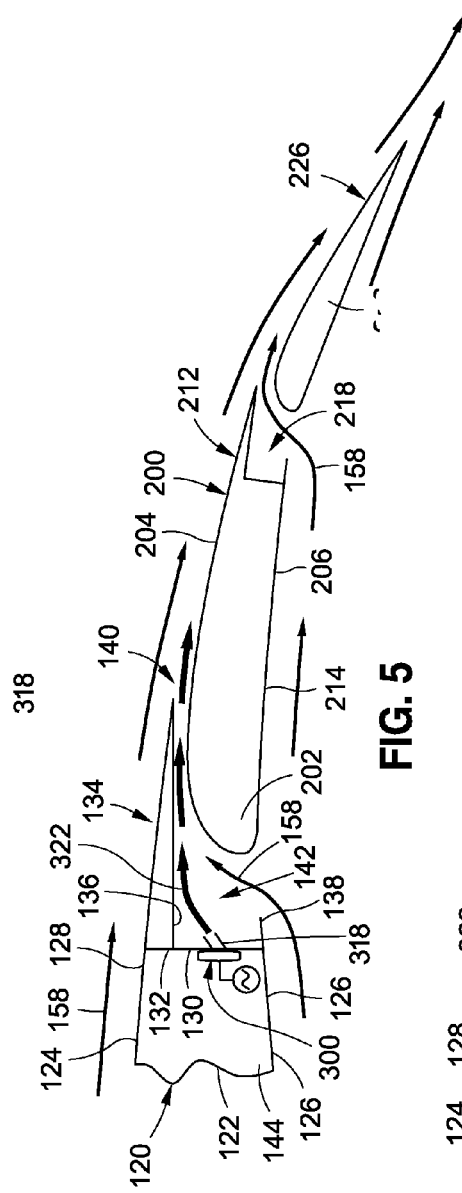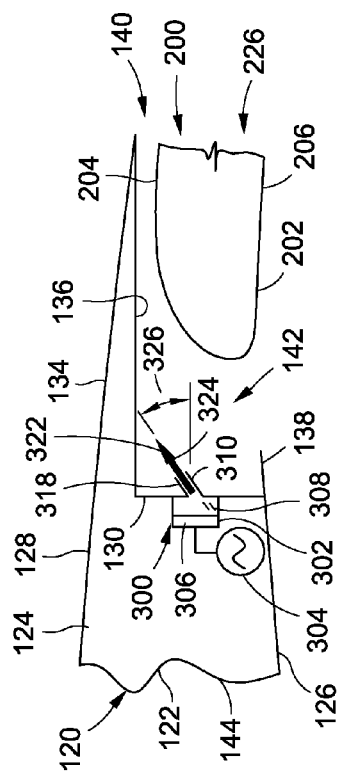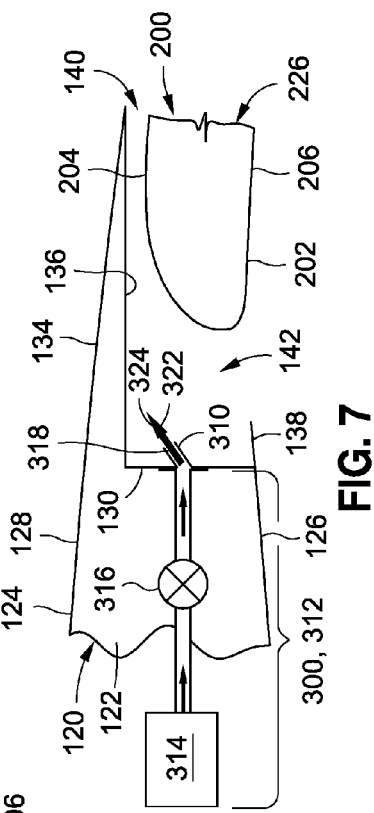
FIG. 5
FIG. 6
FIG. 7

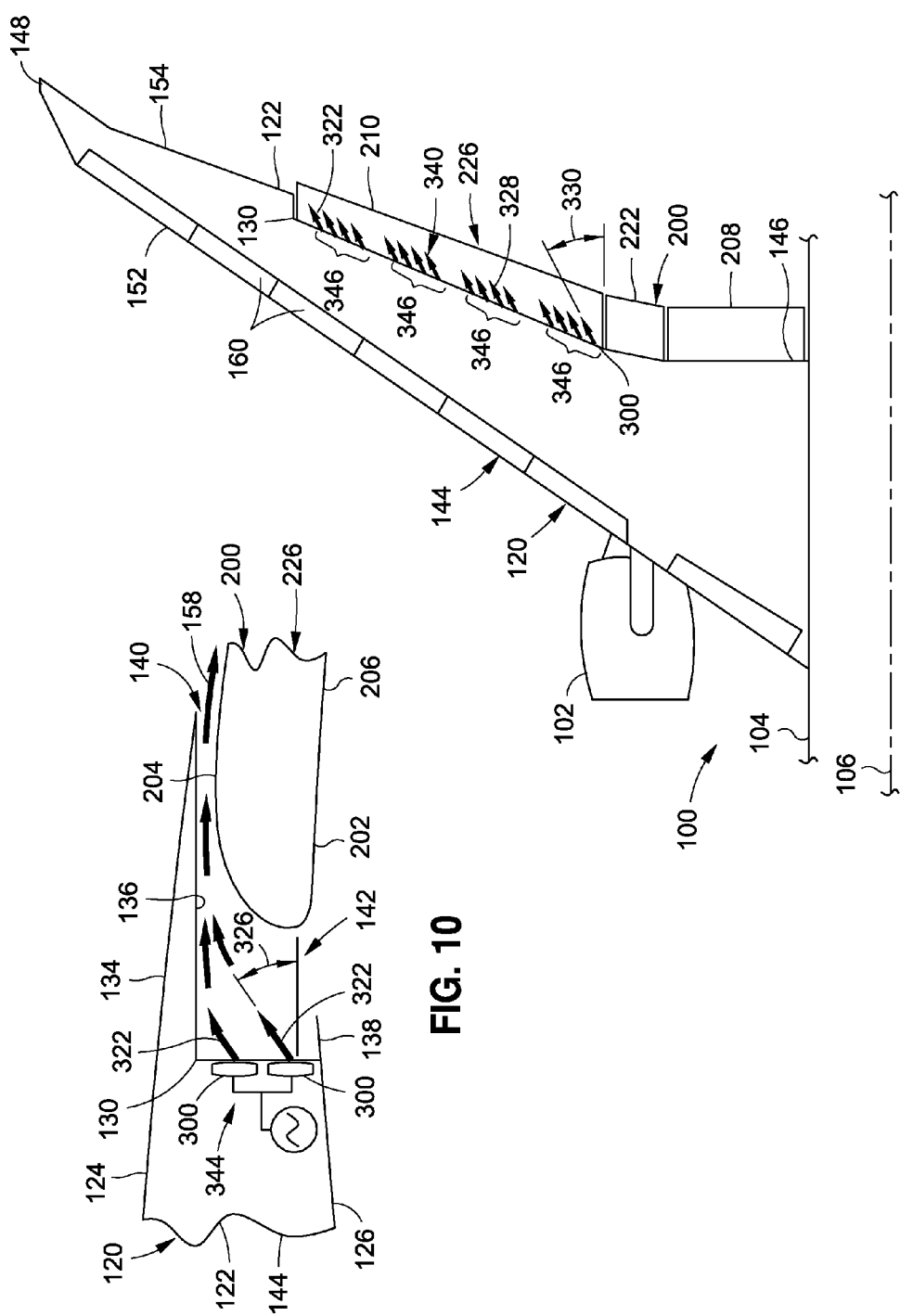

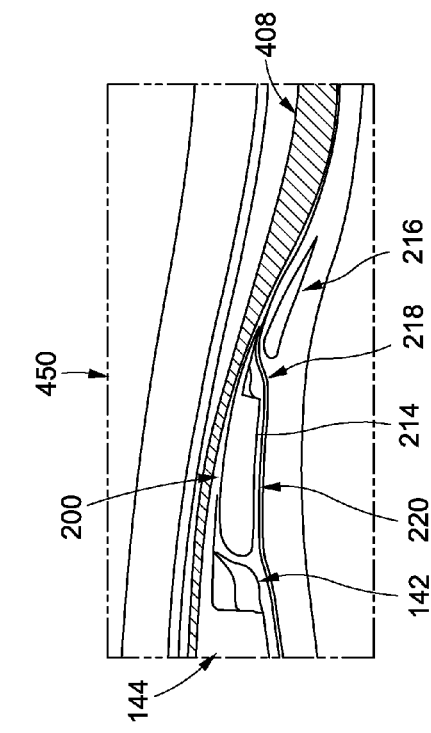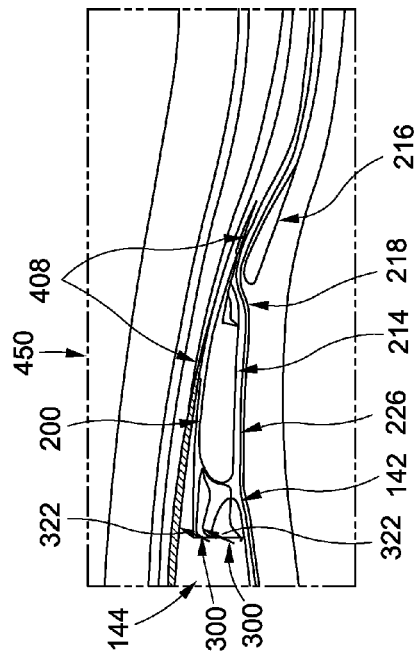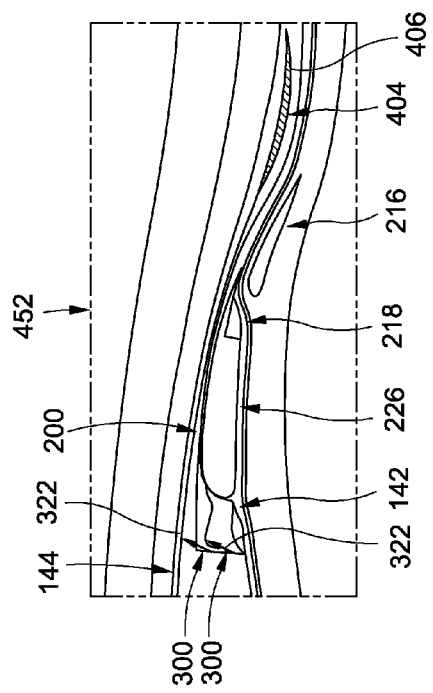

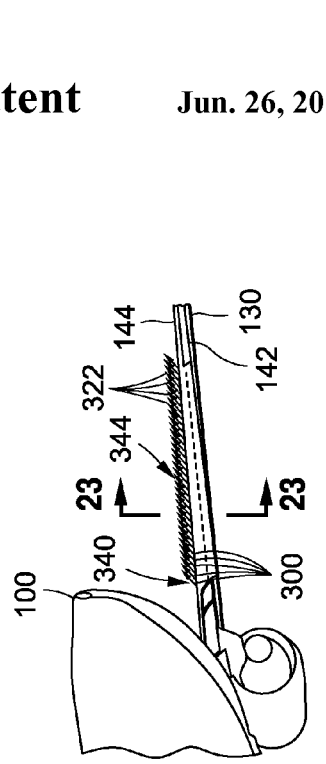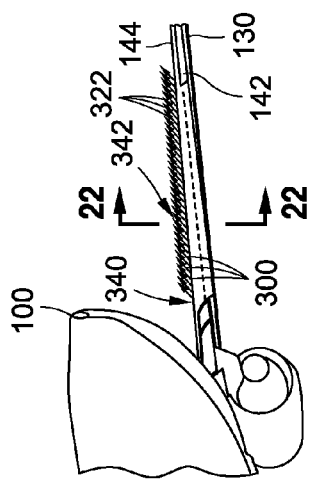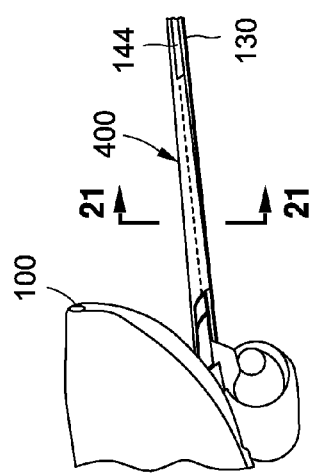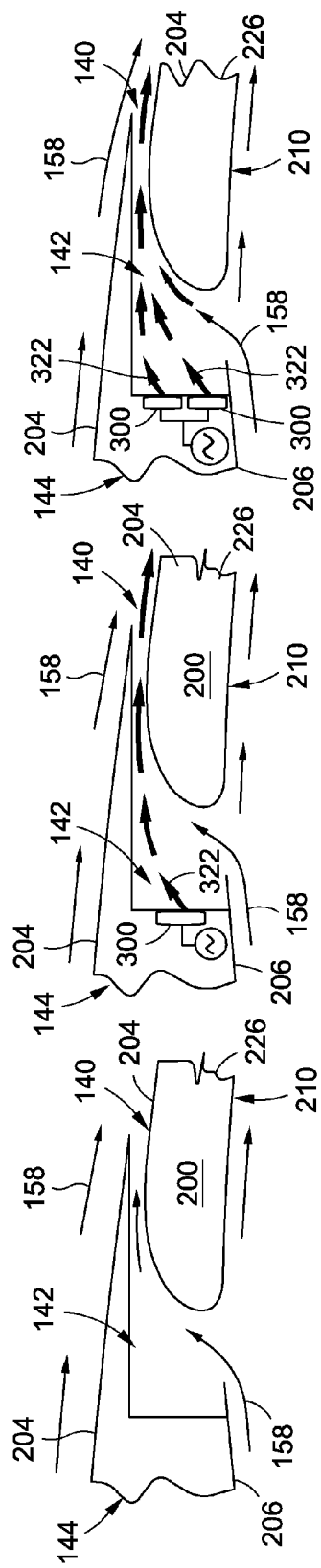

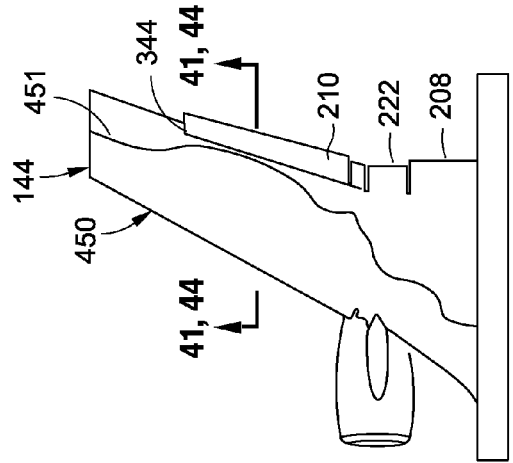
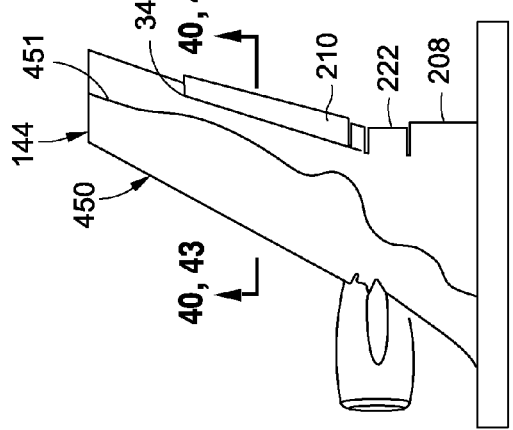
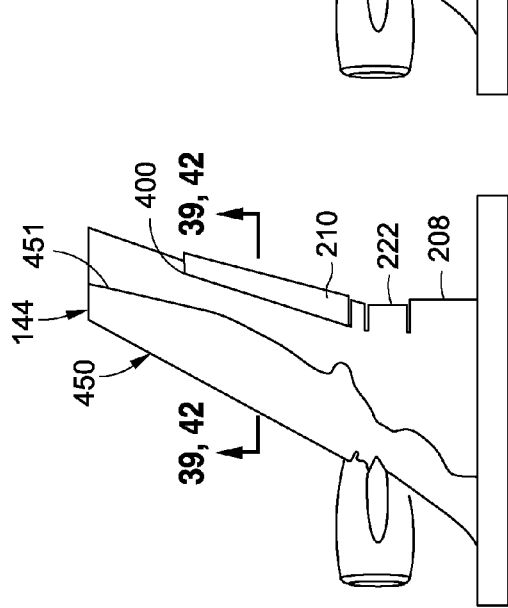
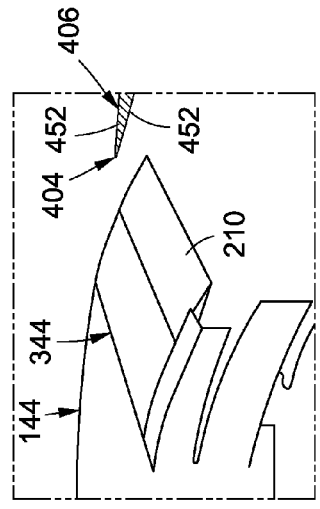
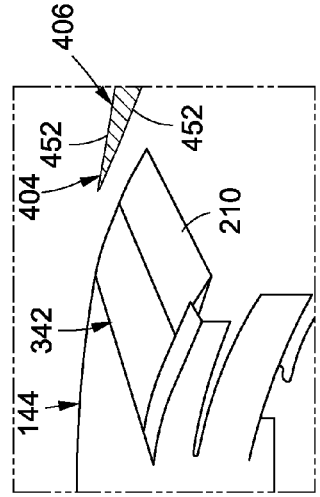
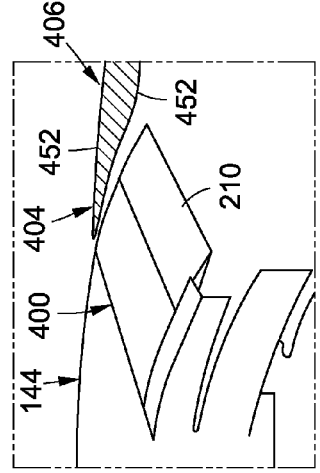

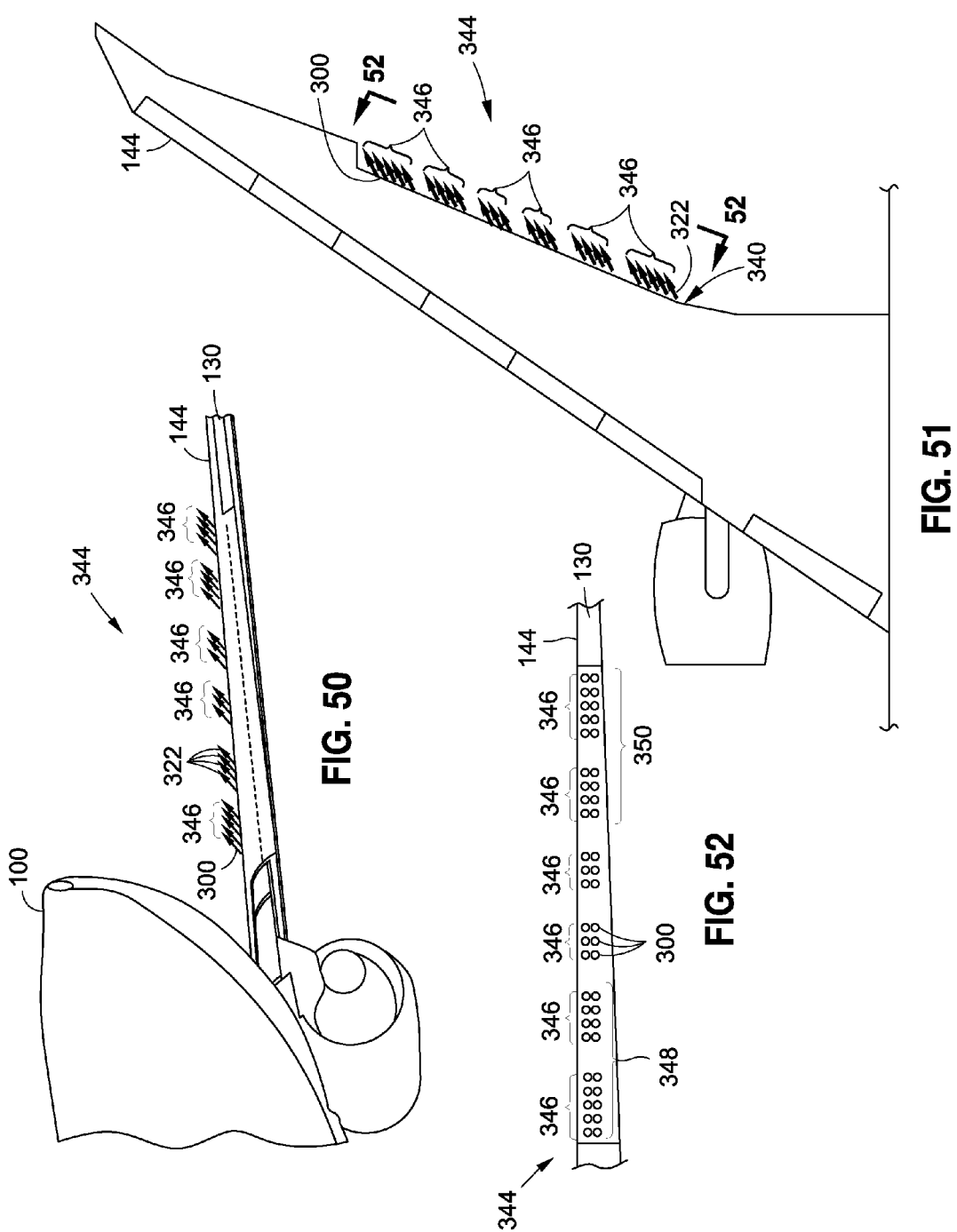

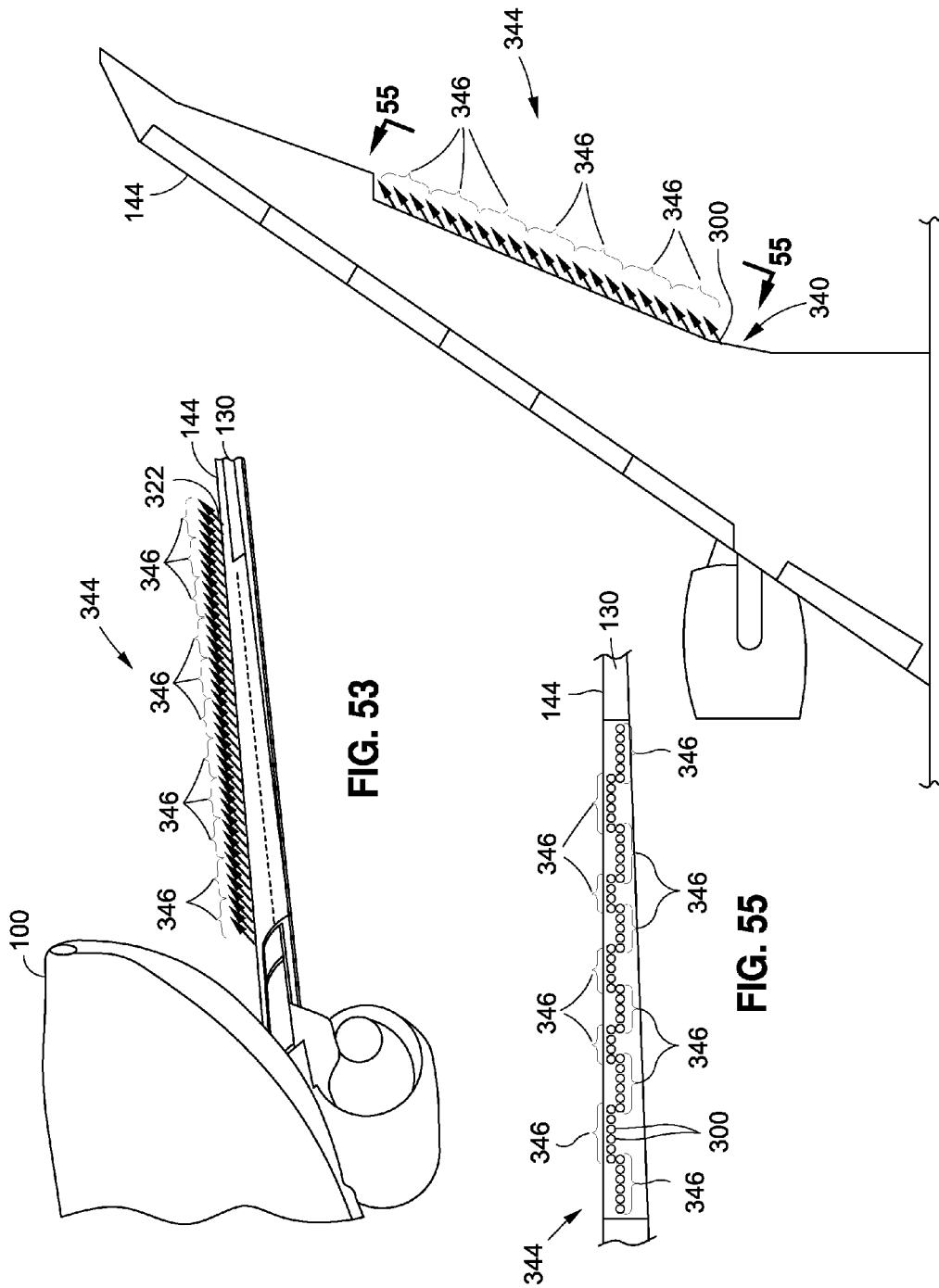

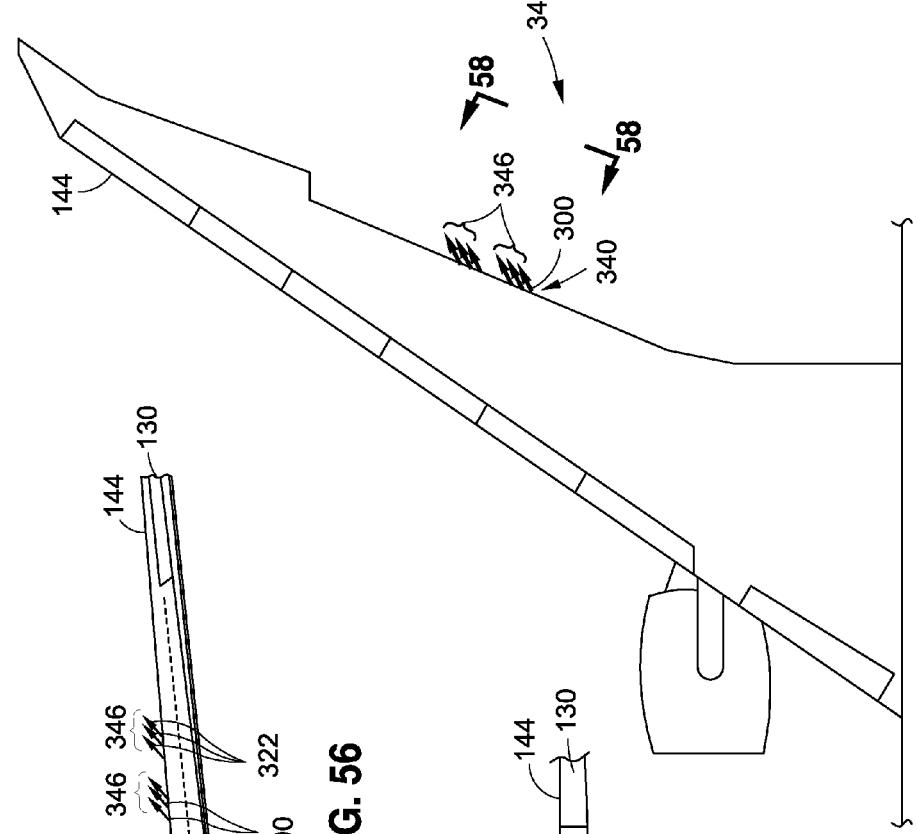
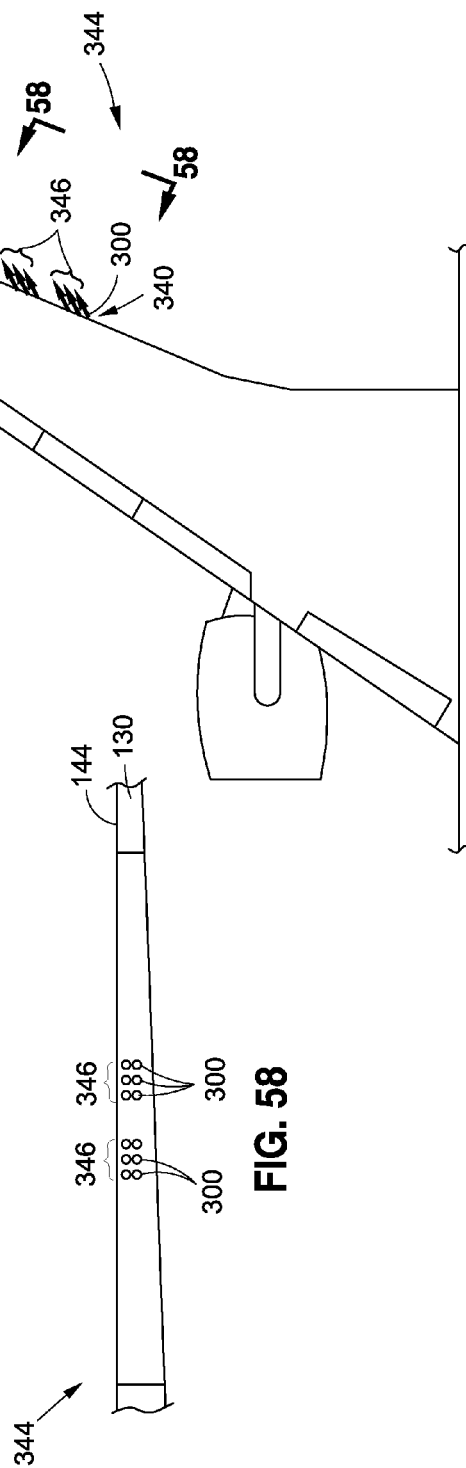
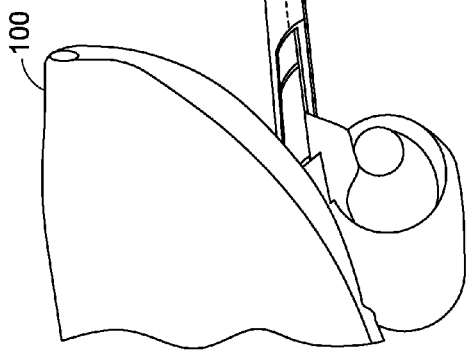

SYSTEM AND METHOD FOR ENHANCING THE HIGH-LIFT PERFORMANCE OF AN AIRCRAFT

FIELD

The present disclosure relates generally to aerodynamics, more particularly, to a system and method for improving the high-lift performance of an aircraft.

BACKGROUND

High-lift performance is a key objective in aircraft design and may be represented by the performance of the aircraft during takeoff and/or landing. An aircraft with improved high-lift performance may have a relatively high maximum takeoff weight for a given runway length. Alternatively, an aircraft with improved high-lift performance may require a reduced runway length for a given maximum takeoff weight. Other advantages provided by high-lift performance include reduced stall speed and/or increased range. The high-lift performance of an aircraft may be provided by one or more types of high-lift systems or devices. For example, the wings of an aircraft may include leading edge slats and/or trailing edge flaps which may be deployed during takeoff and landing to increase lift.

High-lift devices preferably generate a relatively small amount of aerodynamic drag when deployed so that the aircraft has a high lift-to-drag ratio (L/D). A high L/D may result in increased payload capacity, reduced runway length requirements, and/or longer range for the aircraft. For example, for a twin-engine transport aircraft, a 1% increase in L/D during takeoff may result in an increase in payload capacity of up to several thousand pounds or an increase in range of up to 150 nautical miles. In addition, an increase in L/D during takeoff may allow for a reduction in engine size which may translate directly to a reduction in the structural mass of the aircraft and an improvement in fuel efficiency and/or a reduction in engine emissions. High-lift devices also preferably increase the maximum lift coefficient ($C_{Lmax}$) of the aircraft which can result in a significant improvement in the high-lift performance of the aircraft. For example, a 1.5% increase in $C_{Lmax}$ for an example transport aircraft may result in an increase in payload capacity of up to 6600 pounds for a fixed approach speed.

Conventional methods for improving the L/D and the $C_{Lmax}$ of an aircraft rely on the adjustment of a high-lift system within the geometrical constraints of the wings. For example, the geometry and deployment characteristics of leading edge slats and trailing edge flaps may be adjusted in an attempt to improve the L/D and $C_{Lmax}$ at takeoff and landing. Unfortunately, the adjustment of the geometry and deployment characteristics of such high-lift devices represents a limitation to high-lift performance.

As can be seen, there exists a need in the art for a system and method for improving the high-lift performance of an aircraft that is not limited by the geometrical constraints of the wings and/or high-lift devices.

SUMMARY

The above-noted needs associated with the high-lift performance of an aircraft are specifically addressed and alleviated by the present disclosure which provides a drag reduction system including at least one air ejector. The air ejector may have an ejection port located between an aft portion of an airfoil main element and a forward portion of a trailing edge device. The air ejector may be configured to discharge an air jet from the ejection port in such a manner that the air jet passes over the upper surface of the trailing edge device.

In a further embodiment, disclosed is a drag reduction system for a wing of an aircraft. The drag reduction system may include an air ejector having an ejection port located on or near a rear spar of the wing and positioned forward of a forward portion of a trailing edge flap. The air ejector may be configured to discharge an air jet from the ejection port in such a manner that the air jet passes over the upper surface of the trailing edge device when the trailing edge device is deployed causing ambient flow to pass from the lower surface of the airfoil upwardly through a main cove and over the upper surface of the trailing edge device.

Also disclosed is a method of reducing aerodynamic drag of an airfoil. The method may include discharging an air jet from an ejection port of an air ejector. The ejection port may be located between an aft portion of an airfoil main element and a forward portion of a trailing edge device. The method may further include directing the air jet to cause the air jet to pass over the upper surface of the trailing edge device.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a diagrammatic representation of a sectional view of an aircraft wing taken along line 3-3 of FIG. 2 and illustrating the trailing edge device in the retracted position in accordance with one example embodiment;

FIG. 4 is a diagrammatic representation of a sectional view of an aircraft wing showing an air ejector discharging an air jet from an ejection port during deployment of the trailing edge device in accordance with one example embodiment;

FIG. 5 is a diagrammatic representation of a magnified sectional view of an aft portion of the aircraft wing encircled by dashed arc 5 in FIG. 4 and illustrating the air ejector discharging an air jet into a main cove between an aft portion of the airfoil main element and the forward portion of the trailing edge device during deployment thereof;

FIG. 6 is a diagrammatic representation of a sectional view of an aft portion of an airfoil main element showing the air ejector configured as a zero net mass flux jet in accordance with one example embodiment;

FIG. 7 is a diagrammatic representation of a sectional view of an aft portion of an airfoil element showing an air ejector configured as a pneumatic air ejector in accordance with one example embodiment;

FIG. 10 is a diagrammatic representation of a sectional view of an aft portion of an airfoil main element showing air ejectors discharging a pair of air jets in accordance with one example embodiment;

FIG. 11 is a diagrammatic representation of a top view of an aircraft wing illustrating the spanwise array of air ejectors discharging air jets at an outboard angle relative to a longitudinal axis of the aircraft in accordance with one example embodiment;

FIG. 12 is a diagrammatic representation of a computed flow field in terms of Mach number of an aircraft wing oriented at an angle of attack of 10° in a system-off configuration wherein the air ejectors are non-activated and illustrating in cross-hatch a relatively large region of low Mach number;

FIG. 13 is a diagrammatic representation of the computed flow field of the aircraft wing of FIG. 12 represented in terms of total pressure and illustrating in cross-hatch a relatively large region of total pressure loss generated by the trailing edge device;

FIG. 14 is a diagrammatic representation of the computed flow field in terms of Mach number of an aircraft wing oriented at an angle of attack of 10° in a system-on air ejector configuration with the air ejectors discharging air jets and illustrating in cross-hatch a relatively small region of low Mach number;

FIG. 15 is a diagrammatic representation of the computed flow field of the aircraft wing of FIG. 14 represented in terms of total pressure and illustrating in cross-hatch a relatively small region of total pressure loss generated by the trailing edge device;

FIG. 18 is a diagrammatic representation of a perspective view of an aft portion of an aircraft wing in a system-off configuration;

FIG. 19 is a diagrammatic representation of a perspective view of an aft portion of an aircraft wing having a spanwise array of air ejectors arranged in a single-row configuration in accordance with one example embodiment;

FIG. 20 is a diagrammatic representation of a perspective view of an aft portion of an aircraft wing having a spanwise array of air ejectors arranged in a double-row configuration in accordance with one example embodiment;

FIG. 21 is a diagrammatic representation of a sectional view of an aircraft wing taken along line 21-21 of FIG. 18;

FIG. 22 is a diagrammatic representation of a sectional view of an aircraft wing taken along line 22-22 of FIG. 19;

FIG. 23 is a diagrammatic representation of a sectional view of an aircraft wing taken along line 23-23 of FIG. 20;

FIG. 36 is a diagrammatic representation of a top view of a computed flow solution represented as a surface pressure distribution on an aircraft wing at an $\alpha$ of 20° for the system-off configuration (e.g., no air ejectors);

FIG. 37 is a diagrammatic representation of a top view of a computed flow solution represented as a surface pressure distribution on an aircraft wing at an $\alpha$ of 20° and having a single-row configuration of air ejectors in accordance with one example embodiment;

FIG. 38 is a diagrammatic representation of a top view of a computed flow solution represented as a surface pressure distribution on an aircraft wing at an $\alpha$ of 20° and having a double-row configuration of air ejectors in accordance with one example embodiment;

FIG. 39 is a diagrammatic representation of a side view of an aircraft wing and a field of Mach number contours in a vertical sectional cut through the center of the outboard flap taken along line 39-39 of FIG. 36 for the case of α of 20° for the system-off configuration;

FIG. 40 is a diagrammatic representation of a side view of an aircraft wing and a field of Mach number contours in a vertical sectional cut through the center of the outboard flap taken along line 40-40 of FIG. 37 for the case of α of 20° and having the single-row configuration of air ejectors;

FIG. 41 is a diagrammatic representation of a side view of an aircraft wing and a field of Mach number contours in a vertical sectional cut through the center of the outboard flap taken along line 41-41 of FIG. 38 for the case of α of 20° and having the double-row configuration of air ejectors;

FIG. 50 is a diagrammatic representation of a perspective view of an aft portion of an aircraft wing with the trailing edge devices removed to show clusters of air ejectors arranged in a double-row configuration;

FIG. 51 is a diagrammatic representation of a top view of the aircraft wing of FIG. 50 illustrating the spanwise distribution of the air ejectors arranged in clusters;

FIG. 52 is a diagrammatic representation of an end view of the aft portion of the aircraft wing taken along line 52-52 of FIG. 51 and illustrating the clusters of air ejectors in the double-row configuration;

FIG. 53 is a diagrammatic representation of a perspective view of an aft portion of an aircraft wing with the trailing edge devices removed to show staggered clusters of air ejectors arranged in a double-row configuration;

FIG. 54 is a diagrammatic representation of a top view of the aircraft wing of FIG. 53 illustrating the spanwise distribution of the air ejectors;

FIG. 55 is a diagrammatic representation of an end view of the aft portion of the aircraft wing taken along line 55-55 of FIG. 54 and illustrating the staggered clusters of air ejectors;

FIG. 56 is a diagrammatic representation of a perspective view of an aft portion of an aircraft with the trailing edge devices removed to show localized clusters of air ejectors arranged in a double-row configuration;

FIG. 57 is a diagrammatic representation of a top view of the aircraft wing of FIG. 56 illustrating the localized clusters of air ejectors;

FIG. 58 is a diagrammatic representation of an end view of the aft portion of the aircraft wing taken along line 58-58 of FIG. 57 and illustrating localized clusters of air ejectors;

DETAILED DESCRIPTION

Figure 1:
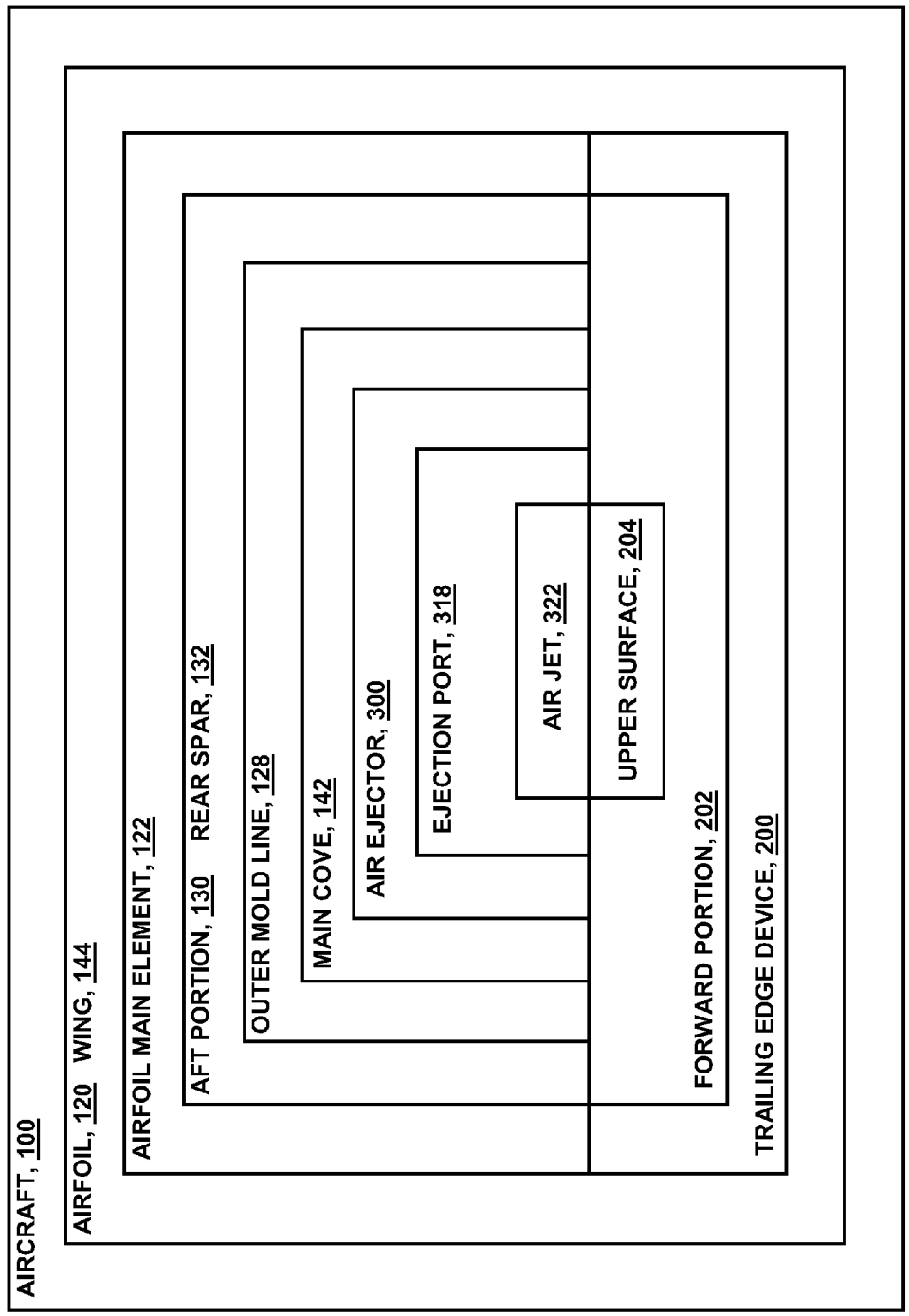
FIG. 1 is a block diagram of an aircraft that may include one or more air ejectors mounted to an airfoil main element and configured to discharge one or more air jets over an upper surface of a trailing edge device in accordance with one example embodiment.

Referring now to the drawings wherein the figures illustrate various embodiments of the present disclosure, shown in FIG. 1 is a block diagram of an aircraft 100 having one or more air ejectors 300 mounted on an airfoil 120. The airfoil 120 may include a deployable trailing edge device 200 located on an airfoil main element 122. In some examples, the airfoil 120 may be a wing 144 of an aircraft 100 and the trailing edge device 200 may be a trailing edge flap such as a Fowler flap. In some examples, a forward portion 202 of the trailing edge device 200 may be configured to nest within a main cove 142 of the airfoil main element 122 when the trailing edge device 200 is in a retracted position 224 (FIG. 3). The main cove 142 may be bounded by an aft portion 130 (e.g., a rear spar 132) of the airfoil main element 122 and may be contained within the bounds of the outer mold line 128 defined by an upper surface 124 (FIG. 3) and a lower surface 126 (FIG. 3) of the airfoil 120. When the trailing edge device 200 is moved from a retracted position 224 (FIG. 3) to a deployed position 226 (FIG. 4), the main cove 142 may be exposed to an ambient flow 158 of air passing from the lower surface 126 of the airfoil 120 and upwardly through the main cove 142 and over an upper surface 204 of the trailing edge device 200 (compare the path of ambient flow 158 in FIG. 3 and FIG. 4).

One or more of the air ejectors 300 may include one or more ejection ports 318. The ejection ports 318 may be located between an aft portion 130 of the airfoil main element 122 and a forward portion 202 of the trailing edge device 200. In the present disclosure, an ejection port 318 may be described as an opening from which an air jet 322 may be discharged. An ejection port 318 may comprise a nozzle 320 (FIG. 6O), an orifice 310 (FIG. 6), or any other ejection port configuration for discharging an air jet 322. In some examples, the ejection ports 318 may be located on a rear spar 132 of a wing 144. The ejection ports 318 may discharge one or more air jets 322 into the main cove 142. The air jets 322 may be discharged from the ejection ports 318 in such a manner that the air jets 322 mix with the ambient flow and pass over the upper surface 204 of the trailing edge device 200. In some examples, the air ejectors 300 may be configured to discharge air jets 322 when the trailing edge device 200 is in a deployed position 226 (FIG. 4) and the main cove 142 is exposed to the ambient flow 158 such as during takeoff or landing of the aircraft 100. The mixing of the air jets 322 with the ambient flow 158 (FIG. 4) may energize and streamline the ambient flow 158. The air ejectors 300 are not limited to discharging jets of air from the ejection ports 318, and may be configured to discharge any type of fluid including any type of gas.

The energizing and streamlining of the ambient flow 158 by the air jets 322 may cause the ambient flow 158 to more closely follow the contour of the upper surface 204 of the trailing edge device 200 and may result in a reduction in a thickness of a boundary layer over the upper surface 204 of the trailing edge device 200 relative to the boundary layer thickness of a trailing edge device of a conventional airfoil. The energizing and streamlining of the ambient flow 158 over the trailing edge device 200 may reduce the size and energy of the viscous wing wake 406 (e.g., FIG. 12) generated by the trailing edge device 200, and may also delay flow separation over the trailing edge device 200 such as at high angles of attack. The discharging of air jets 322 may also reduce aerodynamic drag generated by the trailing edge device 200.

As described in greater detail below, the air ejectors 300 may provide an improvement in the lift-to-drag ratio (L/D) of an aircraft 100 as a result of a reduction in aerodynamic drag of a trailing edge device 200. The improvement in L/D may result in increased payload capacity, reduced runway length requirements, and/or longer range for the aircraft 100. The improvement in L/D may also allow for a reduction in engine size which may reduce the structural mass of the aircraft 100 with a resulting improvement in fuel efficiency and/or a reduction in engine emissions. In addition, the air ejectors 300 may improve the coefficient of lift ($C_L$) of an airfoil 120 which may result in an increase in payload capacity of the aircraft 100.

Figure 2:
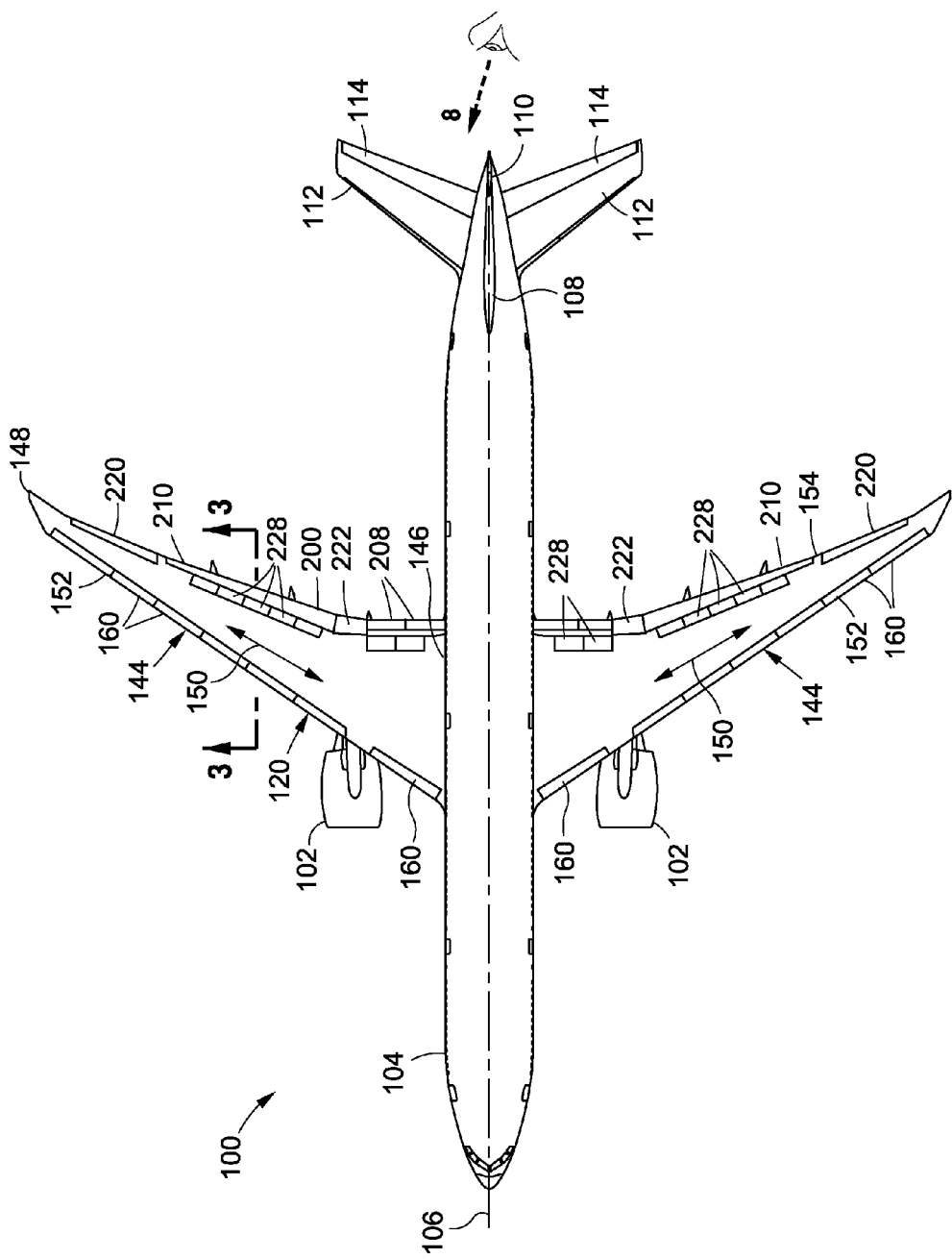
FIG. 2 is a diagrammatic representation of a top view of an aircraft.

FIG. 2 is a top view of an aircraft 100. The aircraft 100 may include a fuselage 104 defining a longitudinal axis 106 and having a pair of wings 144 extending laterally outwardly from the fuselage 104 from a wing root 146 to a wing tip 148. The aircraft 100 may include one or more propulsion units 102 which may be coupled to the wings 144, the fuselage 104, or to other locations on the aircraft 100. The wings 144 may include one or more high-lift devices for improving the high-lift performance of the wing 144 such as during takeoff and landing. For example, the wings 144 may include one or more leading edge devices 160 such as leading edge slats which may be deployed to increase the camber of the wings 144 for increasing wing lift at high angles of attack such as during takeoff and landing. The wings 144 may optionally include spoilers 228 for reducing wing lift such as during approach and landing or in the event of a rejected takeoff.

The aircraft 100 may additionally include one or more trailing edge devices 200 for increasing the wing camber at high angles of attack. In the example aircraft shown, the trailing edge devices 200 may include one or more inboard flaps 208 and one or more outboard flaps 210. The inboard and outboard flaps 210 may be separated by a trailing edge device which may be configured as a flaperon 222. The trailing edge devices 200 for which the air ejectors 300 may be implemented may also include ailerons 220 and/or elevons (not shown) for roll control of the aircraft 100. As indicated above, the wings 144 may include one or more air ejectors 300 for discharging air jets 322 for energizing the airflow over the upper surface 204 of one or more trailing edge devices 200. In one example, a spanwise array 340 (FIG. 11) of air ejectors 300 may be distributed along a spanwise direction 150 (FIG. 2) of the wings 144. The air ejectors 300 may be located at an aft portion 130 (e.g., at the rear spar) of the airfoil main element 122 of the wings 144 and forward of the trailing edge devices 200.

Although the presently-disclosed system and method is described in the context of trailing edge flaps coupled to an aircraft wing, the system and method may be implemented on any one of a variety of airfoil configurations and trailing edge device configurations. For example, the trailing edge device 200 of an aircraft wing 144 may be provided as a flaperon 222, an aileron 220, an elevon (not shown), or other trailing edge device configuration. In other examples, the airfoil 120 may be a horizontal stabilizer 112 (FIG. 2) and the trailing edge device 200 may be an elevator 114. In still further examples, the airfoil 120 may be a vertical stabilizer 108 (FIG. 2) and the trailing edge device 200 may be a rudder 110. In this regard, the airfoil 120 may be configured in any one of a variety of configurations, without limitation, and is not limited to an aircraft wing, a horizontal stabilizer, or a vertical stabilizer. Even further, although the presently-disclosed system and method is described in the context of a tube-and-wing aircraft 100, the system and method may be implemented on any aircraft configuration, without limitation, including hybrid wing-body aircraft (e.g., blended wing aircraft). In addition, the presently-disclosed system and method may be implemented on any type of civil, commercial, and/or military aircraft, without limitation.

FIG. 3 is a sectional view of an airfoil 120 configured as an aircraft wing 144 subjected to an ambient flow 158. The wing 144 includes an upper surface 124 and a lower surface 126 which define an outer mold line 128 of the wing 144. The wing 144 includes a leading edge 152 and trailing edge 154. A chord line 156 may be described as a straight line extending between a forward-most point of the leading edge 152 (e.g., or leading edge device) and an aft-most point of the trailing edge 154 (e.g., or trailing edge device). The wing 144 may include any one of a variety of different types of leading edge devices 160 such as a leading edge slat. The leading edge devices 152 may be deployable (e.g., see FIG. 4) from the leading edge 152.

The aircraft wing 144 may further include at least one trailing edge device 200 shown in a retracted position 224 in FIG. 3. In some examples, a trailing edge device 200 may be configured as a multi-slotted flap 212 such as the double-slotted Fowler flap shown in FIG. 3. A double-slotted flap may include a forward flap 214 and a rear flap 216. The forward portion 202 of the rear flap 216 may nest within a flap cove located at the aft portion 130 of the forward flap 214. The forward portion 202 of the forward flap 214 may nest within the main cove 142 along the aft portion 130 of the wing 144.

One or more air ejectors 300 may be positioned on an aft portion 130 of the wing 144. For example, the ejection ports 318 of one or more air ejectors 300 may be mounted to a rear spar 132 of the wing 144 as the rear spar 132 may provide a relatively rigid mounting structure. In some examples, one or more of air ejectors 300 may be integrated into the wing main element 122. Integration into the wing main element 122 may simplify installation and maintenance of the air ejectors 300. Furthermore, integration of the air ejectors 300 into the wing main element 122 may simplify packaging and accessibility to an electrical power source 304 (e.g., FIG. 6) or a fluidic source 314 (e.g., pressurized air) (e.g., FIG. 7) for discharge from the ejection ports 318.

The ejection ports 318 may be non-exposed to ambient flow 158 when the trailing edge device 200 is in a retracted position 224. In this regard, the ejection port 318 may be non-protruding beyond or may be located below or within an outer mold line 128 of the airfoil 120. As indicated above, the outer mold line 128 may be defined by the upper surface and the lower surface of the airfoil 120. The ambient flow 158 may move in a generally aft direction over the upper surface and lower surface of a wing 144 (see FIG. 3).

FIG. 4 is a sectional view of the aircraft wing 144 of FIG. 3. In FIG. 4, the aircraft wing 144 is oriented at an angle of attack relative to the chord line 156. The leading edge device 160 is shown partially deployed to increase the wing camber to facilitate flow attachment of the ambient flow 158 when the wing 144 is at relatively high angles of attack. The trailing edge device 200 (e.g., the flap) may also be at least partially deployed to increase wing camber. Deployment of the trailing edge device 200 may expose the main cove 142 to ambient flow 158. One or more air ejectors 300 may be mounted adjacent to the main cove 142 between the aft portion 130 of the wing main element 122 and the forward portion 202 of the trailing edge device 200. In the example shown, the air ejector 300 may discharge an air jet 322 from the ejection port 318 along an aft direction relative to a direction of forward motion of the aircraft 100.

FIG. 5 is a magnified sectional view of a portion of the aircraft wing 144 of FIG. 4 and showing the trailing edge device 200 deployed and the main cove 142 exposed to the ambient flow 158. The wing 144 is shown including an overhang 134 which may at least partially define the upper boundary of the main cove 142. The overhang 134 may be an integral portion of the wing 144, or the overhang 134 may comprise a portion of a spoiler 228 (FIG. 2) which may at least partially overlap a forward portion 202 of the trailing edge device 200 when the spoiler 228 is refracted. The overhang 134 may be configured such that when the trailing edge device 200 is deployed, a spanwise gap 140 is generated between an underside 136 of the overhang 134 and the upper surface 204 of the trailing edge device 200. However, in some examples, the wing 144 may lack an overhang 134. In FIG. 5, the wing 144 is also shown including a lower lip 138 which may comprise an extension of a lower surface 126 of the wing 144 and may define a lower boundary of the main cove 142. However, in some examples, the wing 144 may lack a lower lip 138. As indicated above, the forward portion 202 of the trailing edge device 200 may be configured to nest within the main cove 142 such that the overhang 134 and the lower lip 138 prevent ambient flow 158 from passing through the main cove 142 when the trailing edge device 200 is in a retracted position 224 (FIG. 3).

FIG. 5 illustrates the ejection port 318 located on the rear spar 132 of the wing 144 and discharging an air jet 322. In some examples, the air ejector 300 may discharge an air jet 322 when the trailing edge device 200 is deployed and the ambient flow 158 flows from a lower surface 126 of the airfoil main element 122 and passes upwardly into and through the main cove 142. For wings that include an overhang 134, the air jet 322 may mix with the ambient flow 158 passing through the main cove 142 and may exit the spanwise gap 140 between the overhang 134 and the upper surface 204 of the trailing edge device 200. The ambient flow 158 may be energized by the air jet 322 and may flow over the upper surface 204 of the trailing edge device 200.

In FIG. 5, the trailing edge device 200 (e.g., the flap) is partially deployed creating a spanwise gap 140 between the forward portion 202 of the flap and the aft portion 130 of the wing 144 and exposing the main cove 142 to the ambient flow 158 from the lower surface 126 of the wing 144 and upwardly through the main cove 142. The air jet 322 may be discharged from one or more ejection ports 318 in such a manner that the air jets 322 mix with and energize the ambient flow 158 which passes over and follows the contour of the upper surface 204 of the trailing edge device 200. In the multi-slotted flap 212 shown in FIG. 5, the ambient flow 158 may also flow upwardly through a flap cove 218 between the forward portion 202 of the rear flap 216 and the aft portion 130 of the forward flap 214. The mixture of the air jet 322 with the ambient flow 158 over the upper surface 204 of the forward flap 214 may draw ambient flow 158 through the flap cove 218 which may further assist in energizing the flow and reducing the boundary layer thickness to thereby minimize the size of the wake created by the trailing edge device 200.

FIG. 6 is a sectional view of an aft portion 130 of a main element 122 of a wing 144. In some examples, one or more air ejectors 300 may be mounted to a non-movable or fixed portion of the airfoil main element 122. For example, one or more air ejectors 300 including one or more ejection ports may be mounted to a rear spar 132 (FIG. 3) of a wing 144 as mentioned above. The ejection port 318 may be configured to discharge the air jet 322 in an upward direction 324 relative to the chord line 156 (FIG. 4). For example, the ejection port 318 may be configured to discharge an air jet 322 at an upward angle 326 relative to the chord line 156. In some examples, the ejection port 318 may be configured to discharge an air jet 322 at an upward angle 326 of up to approximately 60° relative to the chord line 156, such as at an upward angle 326 of approximately 45° (e.g., ±5°). The ejection port 318 may discharge the air jet 322 toward an underside 136 of the overhang 134 in such a manner that the air jet 322 impinges on the underside 136 of the overhang 134 and is deflected or redirected by the underside 136 toward the spanwise gap 140 between the underside 136 of the overhang 134 and the trailing edge device 200 upper surface 204.

In some examples, the upward angle 326 at which the air jet 322 is discharged from an ejection port 318 may be based on the vertical distance from the ejection port 318 to the underside 136 of the overhang 134. In this regard, ejection ports 318 that are positioned at a relatively short vertical distance from the underside 136 may be configured to discharge air jets 322 at a relatively shallow angle 326 to allow the air jets 322 to be deflected off of the underside 136 and be redirected toward the upper surface 204 of the trailing edge device 200. In contrast, ejection ports 318 that are positioned at a relatively long vertical distance from the underside 136 may be configured to discharge air jets 322 at a relatively large angle 326 to allow the deflected air jet to be redirected toward the upper surface 204 of the trailing edge device 200.

In a further embodiment not shown, one or more of the air ejectors 300 may be mounted on one or more deployable trailing edge devices 200 of an airfoil. For example, one or more air ejectors 300 may be mounted to an aft portion 130 of a forward flap 214 of a multi-slotted flap 212 such as a double-slotted flap or a triple-slotted flap (not shown). A triple-slotted flap may include a forward flap 214 and two (2) or more rear flaps 216 located aft of the forward flap 214 and arranged in forward-aft relation. For example, a triple-slotted flap may include a forward flap 214, and two rear flaps 216 which may include an intermediate flap (not shown) located forward of a rear flap (not shown). In this example, one or more air ejectors 300 may be mounted to an aft portion of the intermediate flap (in addition, to the positions already mentioned above). During deployment of a multi-slotted flap 212, one or more air jets 322 mounted to the aft portion 130 of the forward flap 214 may discharge air jets 322 for mixing with ambient flow 158 flowing through one or more flap coves 218 and energizing the ambient flow 158 passing over the upper surface 204 of the rear flap. The air ejectors 300 may be provided in any one of a variety of different sizes, shapes, and configurations, without limitation. For example, one or more of the air ejectors 300 may be configured as electrically-powered air ejectors 300 (FIG. 6), pneumatic air ejectors 312 (FIG. 7), or other air ejector configurations.

FIG. 6 shows an example of an air ejector 300 configured as a zero-net-mass-flux jet 302. A zero-net-mass-flux jet 302 may be configured as an electromagnetic air ejector, a piezoelectric air ejector, or in other jet configurations. In one example, a zero-net-mass-flux jet 302 may be electrically-powered and may oscillate a piston (not shown) or a membrane 306 that may be mounted within a cavity 308. The oscillation of a membrane 306 may force air through an orifice 310 during outward flexing of the membrane 306, and may draw air back into the orifice 310 during inward flexing of the membrane 306. Advantageously, the zero-net-mass-flux jet 302 may be provided in a relatively small package and may require no external fluid source or pressurized air source. The zero-net-mass-flux jet 302 may be electrically powered by an electrical power source 304 such as a battery and/or by electrical power generated by a propulsion unit of the aircraft 100 (e.g., a gas turbine engine) or an auxiliary power unit (APU).

FIG. 7 shows an example of a pneumatic air ejector 312. The pneumatic air ejector 312 may be provided in any one of a variety of configurations including a constant jet (not shown), a fluidic oscillator (not shown), and a traverse jet (not shown). Advantageously, a pneumatic air ejector 312 may have a relatively small number of moving parts and may operate by receiving pressurized air from a pressurized air source 314. The pneumatic air ejector 312 may include a valve 316 for controlling the discharge of the air jet 322. Pressurized air may be provided to an ejection port 318 (e.g., a nozzle 320) by a dedicated pressurized air source 314 which may be located adjacent to the ejection port 318. Alternatively, pressurized air for operating the pneumatic air ejector 312 may be provided by bleed air from a propulsion unit such as a gas turbine engine or from an APU of an aircraft.

Figure 8:
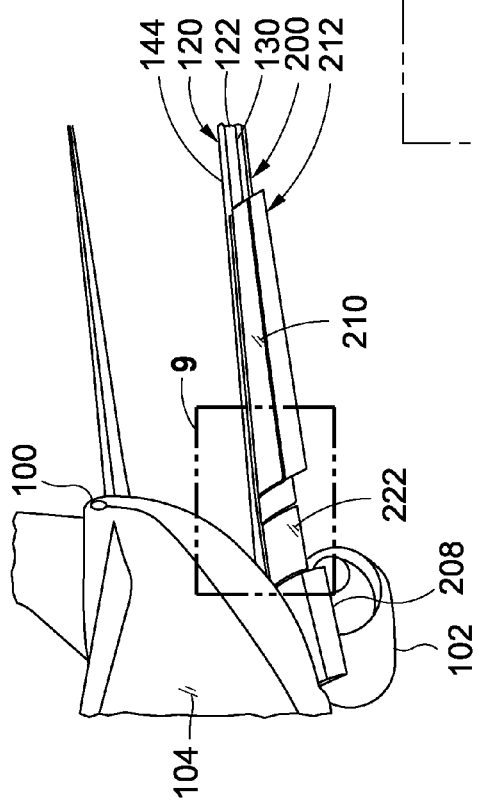
FIG. 8 is a diagrammatic representation of a perspective view taken along line 8 of FIG. 2 and showing a plurality of trailing edge devices deployed from an aircraft wing in accordance with one example embodiment.

FIG. 8 is a perspective rear view of an aircraft wing 144 having a plurality of trailing edge devices 200. The trailing edge devices 200 include an inboard flap 208 and an outboard flap 210 separated by a flaperon 222. The inboard flap 208 and the outboard flap 210 are configured as double-slotted flaps. The flaps are shown in a deployed position 226 (FIG. 5).

Figure 9:
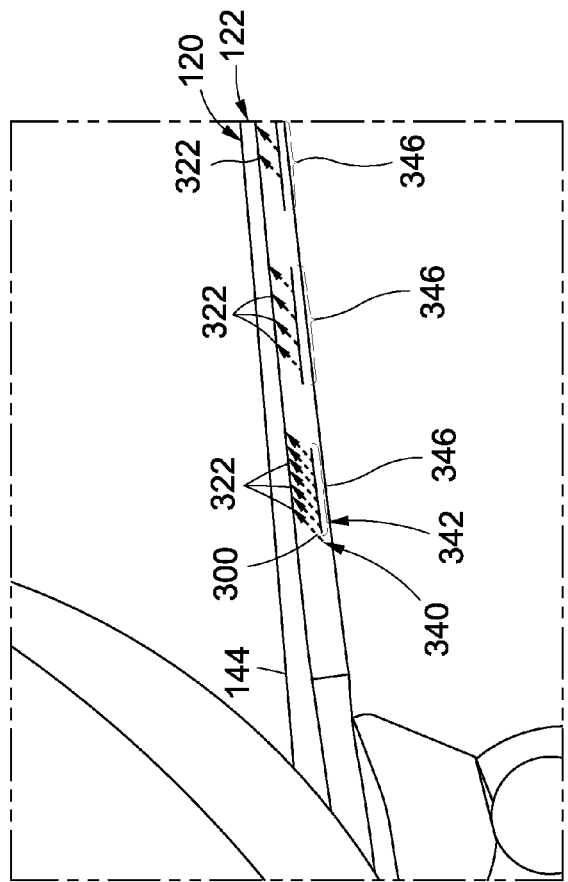
FIG. 9 is a diagrammatic representation of a magnified perspective view of a portion of the aircraft wing bounded by line 9 of FIG. 8 with the trailing edge devices omitted and illustrating a spanwise array of air ejectors arranged in clusters along the aft portion of the aircraft wing in accordance with one example embodiment.

FIG. 9 shows a portion of the aircraft wing 144 of FIG. 8 with the flaps 208, 210, and flaperon 222 omitted to show a spanwise array 340 of air ejectors 300 that may be attached to the aft portion 130 of the wing 144. In the example shown, the air ejectors 300 are arranged in clusters 346 along the aft portion 130 of the aircraft wing 144. For example, in FIG. 9, the inboard set of clusters 346 includes seven (7) air ejectors 300. The adjacent cluster 346 includes four (4) air ejectors 300. The outboard set of clusters 346 in FIG. 9 includes two (2) air ejectors 300. As may be appreciated, the clusters of air ejectors 300 may include any quantity and may be arranged in any manner. For example, although not shown, the aft portion 130 of an aircraft wing 144 may include a spanwise array of air ejectors 300 that are uniformly spaced apart from one another.

FIG. 10 is a sectional view of an aft portion 130 of an airfoil main element 122 (e.g., an aircraft wing) showing air ejectors 300 as may be included on an aft portion 130 of a wing 144. The trailing edge device (e.g., flap) 200 is shown deployed away from the aft portion 130 of the wing 144 exposing the main cove 142 to ambient flow 158 (FIG. 5). The example illustrates the spanwise gap 140 between the wing 144 and the upper surface 204 of the flap when deployed. The example further shows air ejectors 300 configured as a two-port system having a pair of ejection ports 318 arranged on top of one another for discharging a pair of air jets 322. In this regard, the spanwise array 340 (FIG. 9) of air ejectors 300 may form a double-row configuration 344 of air ejectors 300 along a spanwise direction 150. In the example shown, air jets 322 are discharged during deployment of the trailing edge device 200. The air jets 322 are oriented at an upward angle 326 relative to the chord line 156 of the wing 144. Although not shown, one or more of the air ejectors 300 may be configured as a multi-port system wherein a single air ejector 300 may discharge multiple air jets 322 from multiple ejection ports 318.

FIG. 11 is a top view of an aircraft wing 144 showing the trailing edge devices 200 in a deployed position 226 (FIG. 10). Also shown are a spanwise array 340 of air ejectors 300 arranged in clusters 346 along a spanwise direction 150 (FIG. 2) of the wing 144. As indicated above, the spanwise array 340 of air ejectors 300 may be arranged in any configuration and are not limited to clusters. For example, the air ejectors 300 may be arranged in a uniform spacing along the spanwise direction 150. Furthermore, air ejectors 300 may be arranged in a single-row configuration 342 (FIG. 9), a double-row configuration 344 (FIG. 10), or at in any multi-row configuration. The air jets 322 may be directed along an ejection vector. The ejection vector of one or more of the air jets 322 may be oriented in an outboard direction 328. The orientation of the ejection vector may be dictated by the orientation of the ejection port 318 (FIG. 6) or nozzle 320 (FIG. 60) of the air ejectors 300. One or more of the air ejectors 300 may be configured to discharge air jets 322 along a direction non-parallel to the longitudinal axis 106 (FIG. 2 and FIG. 11) of the aircraft 100 such that the air jets 322 are oriented along an outboard angle 330 relative to a longitudinal axis 106. In one embodiment, the air jets 322 may be oriented at an outboard angle 330 of approximately 40° (e.g., ±5°) relative to the longitudinal axis 106. However, in some embodiments, some of the air ejectors 300 may be oriented parallel to the longitudinal axis 106.

FIGS. 12-13 show a computed flow field represented in terms of Mach number distribution 452 (FIG. 12) and total pressure distribution 450 (FIG. 13) for a two-dimensional aircraft wing section with the air ejectors 300 in a system-off configuration (e.g., the baseline configuration—no air jets). The wing 144 is oriented at an angle of attack of 10° in a representative takeoff condition. The wing 144 includes trailing edge devices 200 comprising double-slotted flaps that are shown in a deployed position 226. The deployment of the flaps exposes the main cove 142 (e.g., FIG. 5) and the flap cove 218 (e.g., FIG. 5) to ambient flow 158 which passes upwardly through the respective coves 142, 158 as described above. As can be seen in FIG. 12, the lack of air jets 322 results in a relatively large region of low Mach number 404 shown in cross-hatch aft of the flaps and representing a relatively large viscous wing wake 406. FIG. 13 shows a relatively large region of total pressure loss 408 shown in cross-hatch and generated by the trailing edge device 200, further evidencing a relatively large viscous wing wake 406 for the system-off configuration 400 (e.g., the baseline configuration).

FIGS. 14-15 show the computed flow field represented in terms of Mach number distribution 452 (FIG. 14) and total pressure distribution 450 (FIG. 15) for the aircraft wing section of FIGS. 12-13 with the two-port system of air ejectors 300 in a system-on configuration 402 wherein the air ejectors 300 are discharging air jets 322. The air jets 322 may mix with the ambient flow 158 passing through the main cove 142, thereby energizing and streamlining the ambient flow 158 over the upper surface 204 of the trailing edge device 200. As can be seen, the air jets 322 reduce or narrow the size of the region of low Mach number 404 (FIG. 14—shown in cross-hatch) and the region of total pressure loss 408 (FIG. 15—shown in cross-hatch) aft of the trailing edge device 200 and forward of the trailing edge device 200, and representing a reduction in the size of the viscous wing wake 406 generated by the trailing edge device 200 relative to the larger wake generated by the trailing edge device 200 in the system-off configuration 400 (e.g., FIGS. 12-13). In addition, discharge of the air jets 322 may enhance global circulation around the airfoil 120, thereby increasing lift and reducing the aerodynamic drag generated by the trailing edge device 200 relative to the increased aerodynamic drag associated with a system-off configuration 400. In this regard, the air jets 322 may result in improved aerodynamic efficiency of an airfoil 120.

Figure 16:
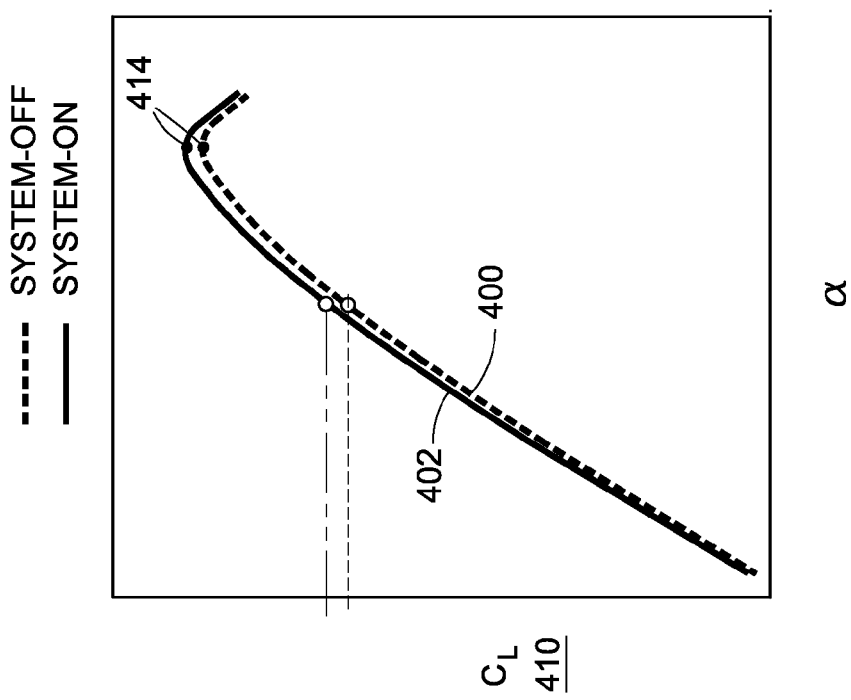
FIG. 16 is a plot of lift coefficient ($C_L$) vs. angle of attack ($\alpha$) for a system-off configuration and for the system-on configuration.

FIG. 16 is a plot of lift coefficient ($C_L$) 410 vs. angle of attack (α) for the aircraft wing section of FIG. 10 with a two-port system of air ejectors 300. The dark long-dashed curve represents the above-described system-off configuration 400 (e.g., the baseline configuration). The dark solid curve represents the system-on configuration 402. As can be seen, the system-on configuration 402 results in lift augmentation over the range of angles of attack (α). The horizontal short-dashed line in FIG. 16 represents the system-off configuration 400 for an α of 10°. The horizontal phantom line in FIG. 16 intersects the dark dashed curve where the angle of attack is 10 degrees and represents the value of the lift coefficient $C_L$ at such angle of attack for the system-on configuration 402. In this regard, for an α of 10°, the system-on configuration 402 results in an increase in $C_L$ of approximately 3.5%. FIG. 16 also illustrates that the system-on configuration 402 results in an increase in maximum lift coefficient ($C_{Lmax}$) 414.

Figure 17:
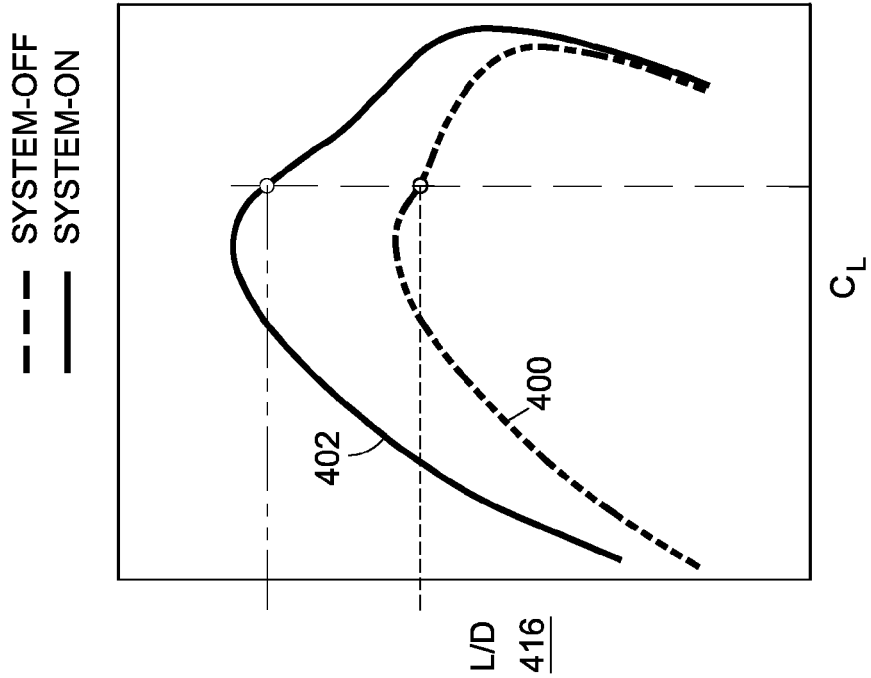
FIG. 17 is a plot of lift-to-drag ratio (L/D) vs. lift coefficient ($C_L$) for the system-off configuration and for the system-on configuration.

FIG. 17 is a plot of lift-to-drag ratio (L/D) 416 vs. lift coefficient ($C_L$) 410 for the aircraft wing section of FIG. 10 with the two-port system of air ejectors 300. The dark long-dashed curve represents the system-off configuration 400. The dark solid curve represents the system-on configuration 402. The horizontal short-dashed line in FIG. 17 represents the L/D for a given $C_L$ for the system-off configuration 400. The horizontal phantom line in FIG. 17 represents the L/D for the system-on configuration 402 for the same $C_L$ as the system-off configuration 400 indicated by the vertical dashed line. In this regard, the system-on configuration 402 provides significant drag reduction and may result in an increase in L/D of approximately 30% over the system-off configuration 400.

FIG. 18 is a perspective rear view of an aft portion 130 of a wing 144 of a twin-engine transport aircraft 100 with the trailing edge devices 200 omitted to illustrate a system-off configuration 400 (e.g., baseline configuration). FIG. 19 is a perspective rear view of an aft portion 130 of an aircraft wing 144 having a spanwise array 340 of air ejectors 300 arranged in a single-row configuration 342 in the main cove 142 forward of the outboard flap 210 (FIG. 2), and illustrating the ejection vectors of the air jets 322 discharged by the air ejectors 300 for a takeoff configuration of the aircraft 100. FIG. 20 is a perspective rear view of an aft portion 130 of an aircraft wing 144 having a spanwise array 340 of air ejectors 300 in a double-row configuration 344 in the main cove 142 of the outboard flap 210, and illustrating a double-row of ejection vectors (FIG. 23) of the air jets 322 discharged by the air ejectors 300 for the takeoff configuration. In FIGS. 19 and 20, the air ejectors 300 may be uniformly distributed with equal spacing between the air ejectors 300 along a spanwise direction 150.

FIG. 21 is a sectional view of the aircraft wing 144 taken along line 21 of FIG. 18 at a mid-span location of the outboard flap 210. The outboard flap 210 (e.g., trailing edge device 200) is shown in the deployed position 226. Ambient flow 158 is flowing from the lower surface 126 of the wing 144 upwardly through the main cove 142 and exiting the spanwise gap 140 between the aircraft wing 144 and the upper surface 204 of the trailing edge device 200.

FIG. 22 is a sectional view of the aircraft wing 144 taken along line 22 of FIG. 19 at a mid-span location of the outboard flap 210 and showing a single-row configuration 342 of air ejectors 300 arranged in a spanwise array 340. The air ejectors 300 are discharging air jets 322 at an upward angle 326 (FIG. 6) of 44° relative to the chord line 156 of the wing 144, and at an outboard angle 330 (FIG. 11) of 40 degrees relative to a longitudinal axis 106 (FIG. 2) of the aircraft 100 (FIG. 18). The air jets 322 may mix with the ambient flow 158 passing upwardly through the main cove 142 and exiting the spanwise gap 140 between the wing 144 and the upper surface 204 of the trailing edge device 200.

FIG. 23 is a sectional view of the aircraft wing 144 taken along line 23 of FIG. 20 at a mid-span location of the outboard flap 210 and showing the double-row configuration 344 of air ejectors 300 arranged in a spanwise array 340. The air ejectors 300 are discharging air jets 322 at an upward angle 326 of 44° relative to the chord line 156, and at an outboard angle 330 (FIG. 11) of 40 degrees relative to the longitudinal axis 106 (FIG. 2). The double-row of air jets 322 may mix with the ambient flow 158 passing upwardly through the main cove 142 and provide further energizing and streamlining of the ambient flow 158 over the upper surface 204 of the trailing edge device 200.

Figure 24:
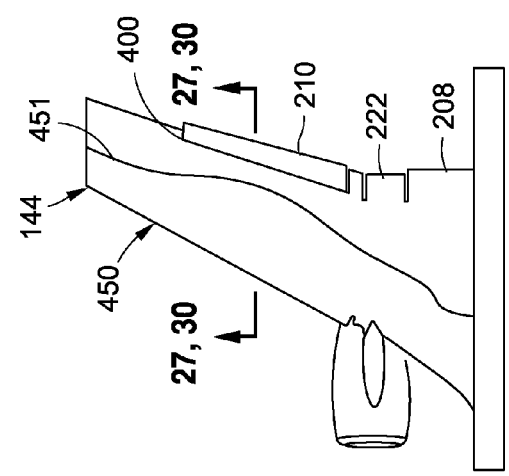
FIG. 24 is a diagrammatic representation of a top view of a computed flow solution represented as a surface pressure distribution on an aircraft wing at an angle of attack ($\alpha$) of 10° for the system-off configuration (i.e., no air ejectors) of FIGS. 18 and 21.

FIG. 24 is a top view of a computed flow solution represented as a surface pressure distribution 450 for the aircraft wing 144 of FIGS. 18 and 21 oriented at an α of 10° for the baseline configuration (i.e., no air ejectors 300). Shown superimposed on the wing 144 is a contour line 451

(e.g., a line of constant pressure) and indicating an area of relatively lower pressure forward of the contour line 451 and an area of relatively higher pressure aft of the contour line 451.

Figure 25:
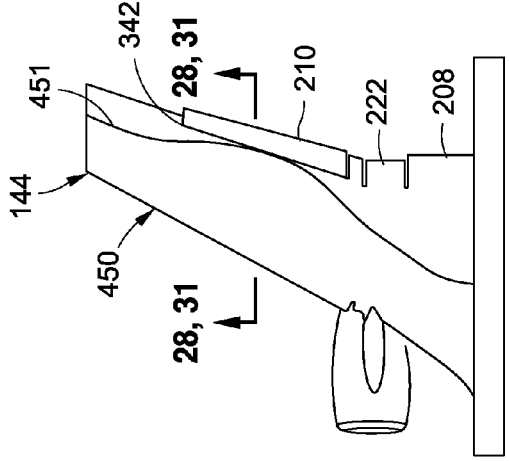
FIG. 25 is a diagrammatic representation of a top view of a computed flow solution represented as a surface pressure distribution of an aircraft wing at an $\alpha$ of 10° for the single-row configuration of air ejectors of FIGS. 19 and 22.

FIG. 25 is a top view of a computed flow solution represented as a surface pressure distribution 450 of the aircraft wing 144 at an α of 10° for the single-row configuration 342 of air ejectors 300 of FIGS. 19 and 22 discharging air jets 322. Shown also is the pressure contour line 451 at the same pressure level as the contour line in FIG. 24. As can be seen in FIG. 25, the contour line 451 along the span of the outboard flap 210 is moved aft relative to the forward-aft location of the contour line 451 in FIG. 24, and indicating an improvement in the flow characteristics (e.g., higher velocity over a larger area) as a result of the air jets 322 from the single-row configuration 342 of air ejectors 300.

Figure 26:
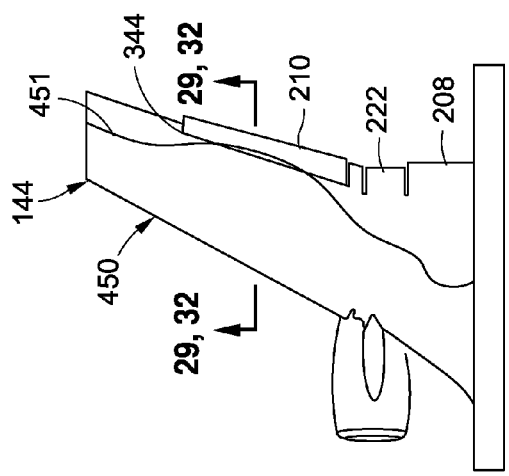
FIG. 26 is a diagrammatic representation of a top view of a computed flow solution represented as a surface pressure distribution of an aircraft wing at an $\alpha$ of 10° for the double-row configuration of air ejectors of FIGS. 20 and 23.

FIG. 26 is a top view of a computed flow solution represented as a surface pressure distribution 450 of the aircraft wing 144 at an α of 10° for the double-row configuration 344 of air ejectors 300 of FIGS. 20 and 23 discharging air jets 322. Shown also is the pressure contour line 451 for the same pressure level as the contour line 451 in FIGS. 24 and 25. As can be seen in FIG. 25, the contour line 451 along the span of the outboard flap 210 is moved still further aft relative to the contour line 451 in FIG. 25, and indicating a further improvement in flow characteristics as a result of the air jets 322 from the double-row configuration 344 of air ejectors 300.

Figure 27:
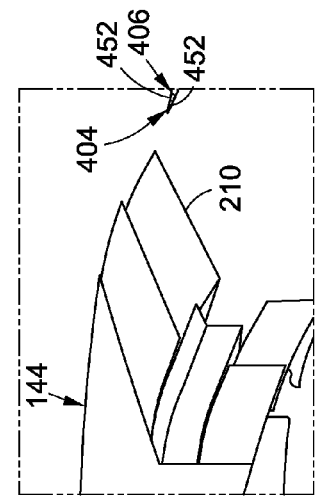
FIG. 27 is a diagrammatic representation of a side view of an aircraft wing and a field of Mach number contours in a vertical sectional cut through the center of the outboard flap taken along line 27-27 of FIG. 24 for the case of $\alpha$ of 10° for the baseline configuration of FIGS. 18 and 21.
Figure 30:
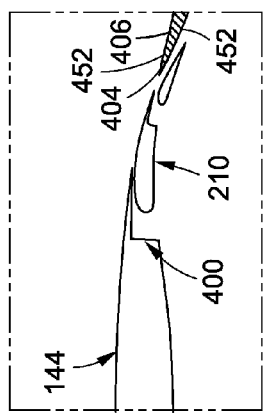
FIG. 30 is a diagrammatic representation of a vertical sectional cut through the center of an outboard flap taken along line 30-30 of FIG. 24 and illustrating a relatively large size of a region of low Mach number representing a relatively large viscous wing wake.

FIGS. 27 and 30 are respectively a side view (FIG. 27) and a vertical section cut through the outboard flap 210 (FIG. 30) showing the Mach number contours 452 of the aircraft wing 144 oriented at an α of 10° for the baseline configuration shown in FIGS. 18 and 21. FIGS. 27 and 30 illustrate the relatively large size of a pocket or region of low Mach number 404 shown in cross-hatch and representing a relatively large viscous wing wake 406 for the baseline system-off configuration 400 (i.e., no air ejectors 300).

Figure 28:
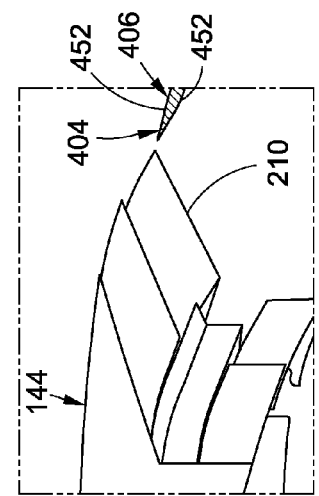
FIG. 28 is a diagrammatic representation of a side view of an aircraft wing and a field of Mach number contours in a vertical sectional cut through the center of the outboard flap taken along line 28-28 of FIG. 25 for the case of $\alpha$ of 10° for the single-row configuration of air ejectors of FIGS. 19 and 22.
Figure 31:
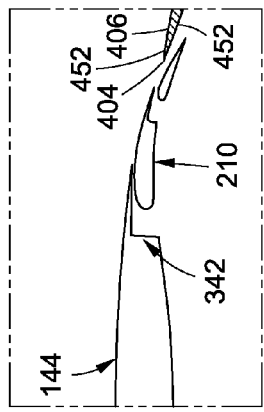
FIG. 31 is a diagrammatic representation of a vertical sectional cut through a center of an outboard flap taken along line 31-31 of FIG. 25 and illustrating a reduced size of a region of low Mach number as a result of the air jets discharged by the single-row configuration of air ejectors.

FIGS. 28 and 31 are respectively a side view (FIG. 28) and a vertical section cut through the outboard flap 210 (FIG. 31) showing the Mach number contours 452 of the aircraft wing 144 oriented at an α of 10° for the single-row configuration 342 of air ejectors 300 shown in FIGS. 19 and 22. FIGS. 28 and 31 illustrate a reduced size of the pocket or region of low Mach number 404 (shown in cross-hatch) as a result of the air jets 322 discharged by the single-row configuration 342 of air ejectors 300. The reduced size of the pocket of low velocity (e.g., Mach number) is the result of an acceleration of the ambient flow 158 through the main cove 142 when the air jets 322 are discharged by the air ejectors 300. The air jets 322 may add momentum to the ambient flow 158 which augments a Coanda effect of the flow over the trailing edge device 160 and effectively streamlines the ambient flow 158 over a substantial portion of the flap system.

Figure 29:
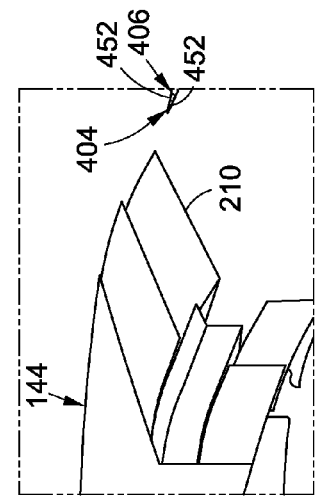
FIG. 29 is a diagrammatic representation of a side view of an aircraft wing and a field of Mach number contours in a vertical sectional cut through the center of the outboard flap taken along line 29-29 of FIG. 26 for the case of $\alpha$ of 10° for the double-row configuration of air ejectors of FIGS. 20 and 23.
Figure 32:
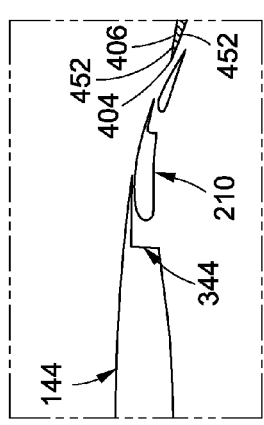
FIG. 32 is a diagrammatic representation of a vertical sectional cut through a center of an outboard flap taken along line 32-32 of FIG. 26 and illustrating a further reduced size of a region of low Mach number as a result of the air jets discharged by the double-row configuration of air ejectors.

FIGS. 29 and 32 are respectively a side view (FIG. 29) and a vertical section cut through the outboard flap 210 (FIG. 32) showing the Mach number contours 452 of the aircraft wing 144 at an α of 10° for the double-row configuration 344 of air ejectors 300 shown in FIGS. 20 and 23. FIGS. 29 and 32 illustrate a further reduced size of the pocket or region of low Mach number 404 (shown in cross-hatch) as a result of the air jets 322 (FIG. 23) discharged by the double-row configuration 344 of air ejectors 300. The region of low Mach number 404 in FIGS. 29 and 32 is significantly reduced for the double-row configuration 344 as compared to the size of the pockets of low Mach number 404 in the baseline system-off configuration 400 (i.e., FIGS. 27 and 30—no air ejectors 300).

Figure 33:
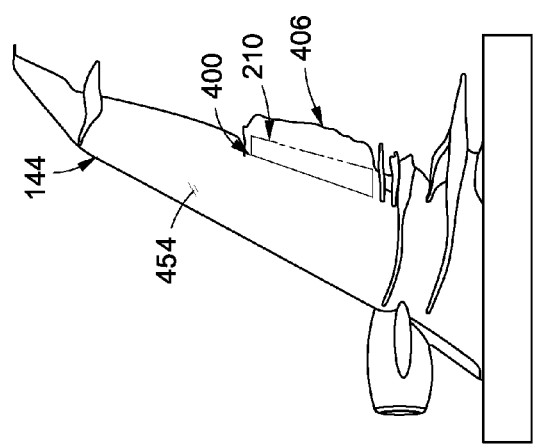
FIG. 33 is a diagrammatic representation of a top view of an iso-surface of a streamwise component of a velocity vector over the aircraft wing at an $\alpha$ of 10° for the baseline configuration of FIGS. 18 and 21.

FIG. 33 is a top view of an iso-surface 454 of a streamwise component of a velocity vector over the aircraft wing 144 at an α of 10° for the baseline configuration of FIGS. 18 and 21. FIG. 33 illustrates a relatively large size of the wing wake 406 generated by the outboard flap 210 in the baseline system-off configuration 400 (e.g., no air ejectors 300).

Figure 34:
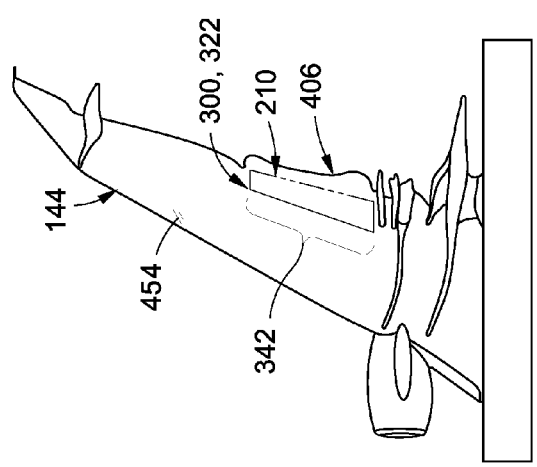
FIG. 34 is a diagrammatic representation of a top view of the iso-surface of the streamwise component of a velocity vector over the aircraft wing at an $\alpha$ of 10° for the single-row configuration of air ejectors of FIGS. 19 and 22.

FIG. 34 shows the iso-surface 454 of the streamwise component of the velocity vector over the aircraft wing 144 at an α of 10° for the single-row configuration 342 of air ejectors 300 of FIGS. 19 and 22. As can be seen, the size of the wing wake 406 for the single-row configuration 342 is significantly reduced relative to the system-off configuration 400.

Figure 35:
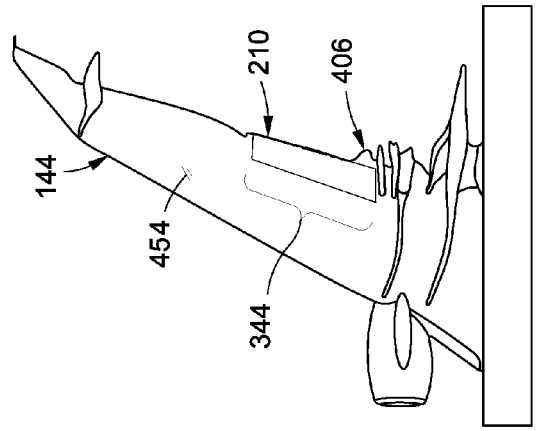
FIG. 35 is a diagrammatic representation of a top view of the iso-surface of a streamwise component of a velocity vector over the aircraft wing at an $\alpha$ of 10° for the double-row configuration of air ejectors of FIGS. 20 and 23.

FIG. 35 shows the iso-surface 454 of a streamwise component of a velocity vector over the aircraft wing 144 at an α of 10° for the double-row configuration 344 of air ejectors 300 of FIGS. 20 and 23. The wing wake 406 in FIG. 35 is almost eliminated along a majority of the outboard flap 210 as a result of the air jets 322 discharged by the double-row configuration 344 of air ejectors 300.

FIG. 36 is a top view of a computed flow solution represented as a surface pressure distribution 450 on an aircraft wing 144 at an α of 20° at near maximum coefficient of lift $C_{Lmax}$ for the baseline configuration (e.g., no air ejectors 300) of FIGS. 18 and 21. The contour line 451 (e.g., line of constant pressure) indicates an area of relatively lower pressure forward of the contour line and an area of relatively higher pressure aft of the contour line 451.

FIG. 37 is a top view of a computed flow solution represented as a surface pressure distribution 450 of an aircraft wing 144 at an α of 20° and having a single-row configuration 342 of air ejectors 300 of FIGS. 19 and 22 discharging air jets 322. Shown also is the pressure contour line 451 for the same pressure level as the contour line 451 in FIG. 36. As can be seen in FIG. 37, a portion of the contour line 451 forward of the span of the outboard flap 210 is moved slightly aft relative to the forward-aft location of the contour line 451 in FIG. 36, and indicating improved flow over the wing 144 as a result of the air jets 322 from the single-row configuration 342 of air ejectors 300.

FIG. 38 is a top view of a computed flow solution represented as a surface pressure distribution 450 of an aircraft wing 144 at an α of 20° and having a double-row configuration 344 of air ejectors 300 of FIGS. 20 and 23 discharging air jets 322. In FIG. 38, the contour line 451 forward of the span of the outboard flap 210 is moved still further aft relative to the location of the contour line 451 in FIG. 37, and indicating a further improvement in the flow over the wing 144 as a result of the air jets 322 from the double-row configuration 344 of air ejectors 300.

Figure 42:
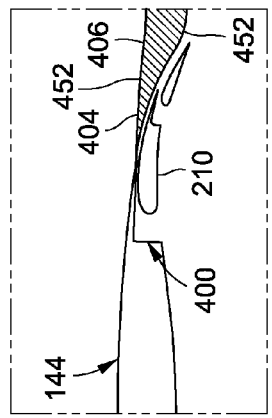
FIG. 42 is a diagrammatic representation of a vertical sectional cut through a center of an outboard flap taken along line 42-42 of FIG. 36 and illustrating a relatively large region of low Mach number representing a relatively large viscous wing wake.

FIGS. 39 and 42 are respectively a side view (FIG. 39) and a vertical section cut through the outboard flap 210 (FIG. 42) showing the Mach number contours 452 of the aircraft wing 144 at an α of 20° at near maximum coefficient of lift $C_{Lmax}$ for the baseline configuration (i.e., no air ejectors 300) shown in FIGS. 18 and 21. FIGS. 39 and 42 illustrate a propensity for off-surface separation of the ambient flow 158 represented by the relatively large size of the region of low Mach number 404 (shown in cross-hatch) and the resulting large pocket of viscous wing wake 406 generated by the outboard flap 210 for the baseline configuration of the wing 144 at an α of 20° relative to the size of the viscous wing wake 406 for the wing 144 at an α of 10° (FIGS. 27, 30, and 33).

Figure 43:
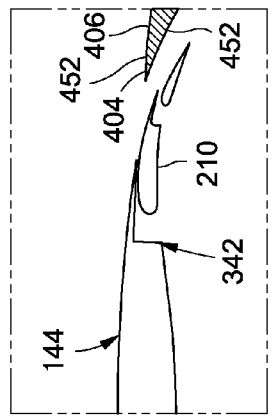
FIG. 43 is a diagrammatic representation of a vertical sectional cut through a center of an outboard flap taken along line 43-43 of FIG. 37 and illustrating a reduced region of low Mach number as a result of the air jets discharged by the single-row configuration of air ejectors.

FIGS. 40 and 43 are respectively a side view (FIG. 40) and a vertical section cut through the outboard flap 210 (FIG. 43) showing the Mach number contours 452 of the aircraft wing 144 at an α of 20° for the single-row configuration 342 of air ejectors 300 shown in FIGS. 19 and 22. FIGS. 40 and 43 illustrate a reduced size of the region of low Mach number 404 (shown in cross hatch) as a result of the attenuation of adverse pressure distribution provided by the air jets 322 from the single-row configuration 342 of air ejectors 300. In addition, the air jets 322 may enhance circulation and thereby delay the onset of flow separation.

Figure 44:
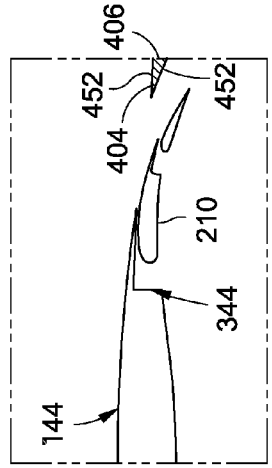
FIG. 44 is a diagrammatic representation of a vertical sectional cut through a center of an outboard flap taken along line 44-44 of FIG. 38 and illustrating a further reduced region of low Mach number as a result of the air jets discharged by the double-row configuration of air ejectors.

FIGS. 41 and 44 are respectively a side view (FIG. 41) and a vertical section cut through the outboard flap 210 (FIG. 44) showing the Mach number contours 452 of the aircraft wing 144 at an α of 20° for the double-row configuration 344 of air ejectors 300 shown in FIGS. 20 and 23. FIGS. 41 and 44 illustrate a further reduced size of the region of low Mach number 404 (shown in cross hatch) as a result of the air jets 322 discharged by the double-row configuration 344 of air ejectors 300.

Figure 45:
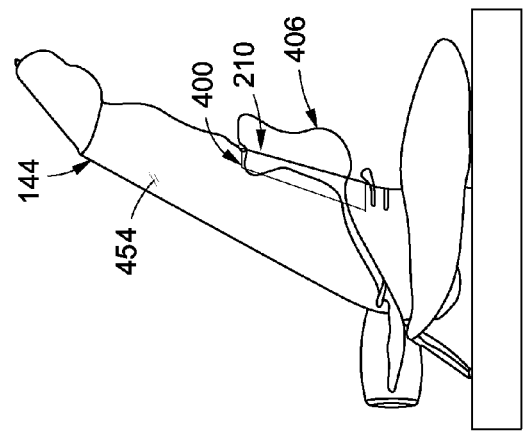
FIG. 45 is a diagrammatic representation of a top view of the iso-surface of a streamwise component of a velocity vector over the aircraft wing of FIG. 36 at an α of 20° for the system-off configuration (e.g., no air jets)

FIG. 45 is a top view of the iso-surface 454 of the streamwise component of the velocity vector over the aircraft wing 144 of FIG. 36 at an α of 20° for the baseline configuration (e.g., no air jets 322). FIG. 45 shows a wing wake 406 generated by the outboard flap 210 in the baseline configuration for the wing 144 at an α of 20° that is larger in size relative to the size of the wing wake 406 at an α of 10° (FIG. 33).

Figure 46:
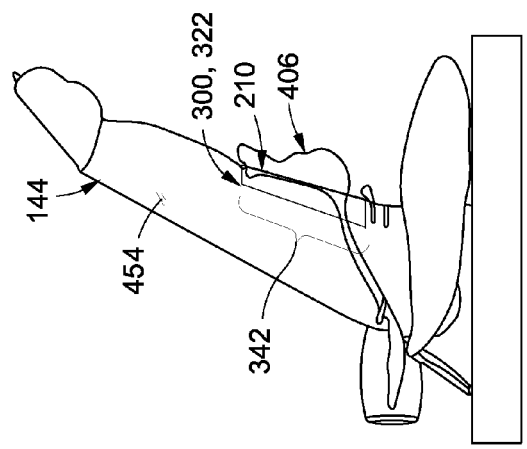
FIG. 46 is a diagrammatic representation of a top view of the iso-surface of the streamwise component of a velocity vector over the aircraft wing of FIG. 37 at an α of 20° for the single-row configuration of air ejectors.

FIG. 46 is a top view of the iso-surface 454 of the streamwise component of the velocity vector over the aircraft wing 144 of FIG. 37 at an α of 20° for the single-row configuration 342 of air ejectors 300. The size of the viscous wing wake 406 of the outboard flap 210 for the single-row configuration 342 is reduced relative to the size of the viscous wing wake 406 generated by the outboard flap 210 for the baseline configuration shown in FIG. 45.

Figure 47:
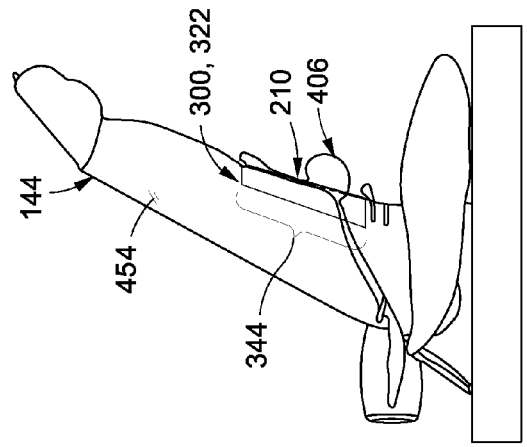
FIG. 47 is a diagrammatic representation of a top view of the iso-surface of a streamwise component of a velocity vector over the aircraft wing of FIG. 38 at an α of 20° for the double-row configuration of air ejectors.

FIG. 47 is a top view of the iso-surface 454 of the streamwise component of the velocity vector over the aircraft wing 144 of FIG. 38 at an α of 20° for the double-row configuration 344 of air ejectors 300. The wing wake 406 shown in cross hatch in FIG. 47 for the outboard flap 210 is reduced in size for the double-row configuration 344 of air ejectors 300 relative to the size of the wing wake 406 shown in FIG. 46 for the single-row configuration 342.

Figure 48:
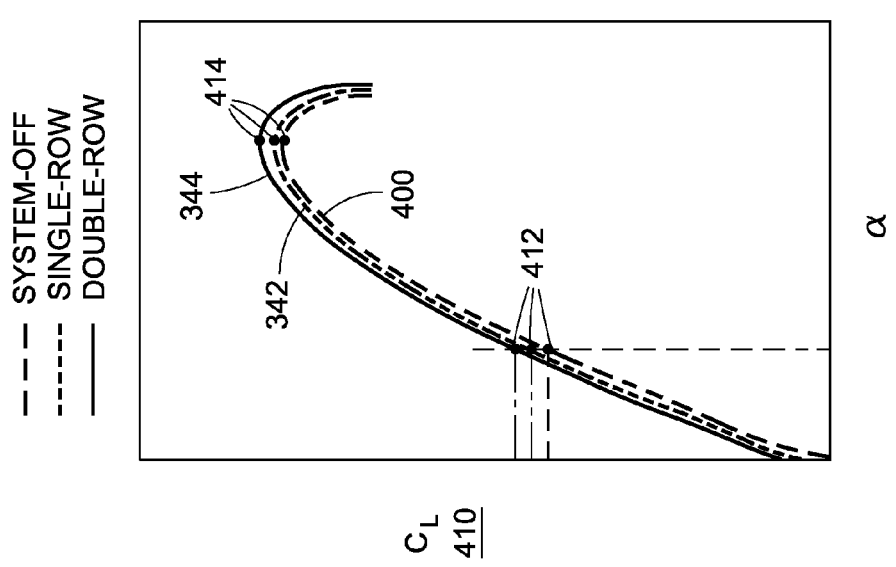
FIG. 48 is a plot of lift coefficient ($C_L$) vs. angle of attack (α) for the system-off baseline configuration (e.g., no air ejectors) of FIG. 30, the single-row configuration of air ejectors of FIG. 31, and the double-row configuration of air ejectors of FIG. 32.

FIG. 48 is a plot of lift coefficient ($C_L$) 410 vs. angle of attack (α) for the aircraft wing 144 in the system-off configuration 400 shown in FIGS. 18 and 21, the single-row configuration 342 shown in FIGS. 19 and 22, and the double-row configuration 344 shown in FIGS. 20 and 23. The dark long-dashed curve represents the system-off configuration 400 (e.g., no air ejectors 300). The dark short-dashed curve represents the system-on single-row configuration 342 of air ejectors 300. The dark solid curve represents the system-on double-row configuration 344 of air ejectors 300. The vertical dashed line in FIG. 48 represent the wing 144 at an α of 10°. The horizontal short-dashed line in FIG. 48 represents the value of the lift coefficient $C_L$ for the system-off configuration 400 for an α of 10°. The horizontal phantom line in FIG. 48 intersects the dark short-dashed curve where the angle of attack is 10 degrees and represents the value of the lift coefficient $C_L$ at such angle of attack for the single-row configuration 342. The horizontal centerline in FIG. 48 intersects the dark solid curve where the angle of attack is 10 degrees and represents the value of the lift coefficient $C_L$ at such angle of attack for the double-row configuration 344. As can be seen, the single-row configuration 342 and the double-row configuration 344 provide lift augmentation over the range of angles of attack (α) relative to the system-off configuration 400. For example, the single-row configuration 342 and the double-row configuration 344 provide improvements in the nominal lift coefficient ($C_{Lnom}$) 412 at a of 10° and at the maximum lift coefficient ($C_{Lmax}$) 414 relative to the $C_{Lnom}$ and $C_{Lmax}$ for the system-off configuration 400.

Figure 49:
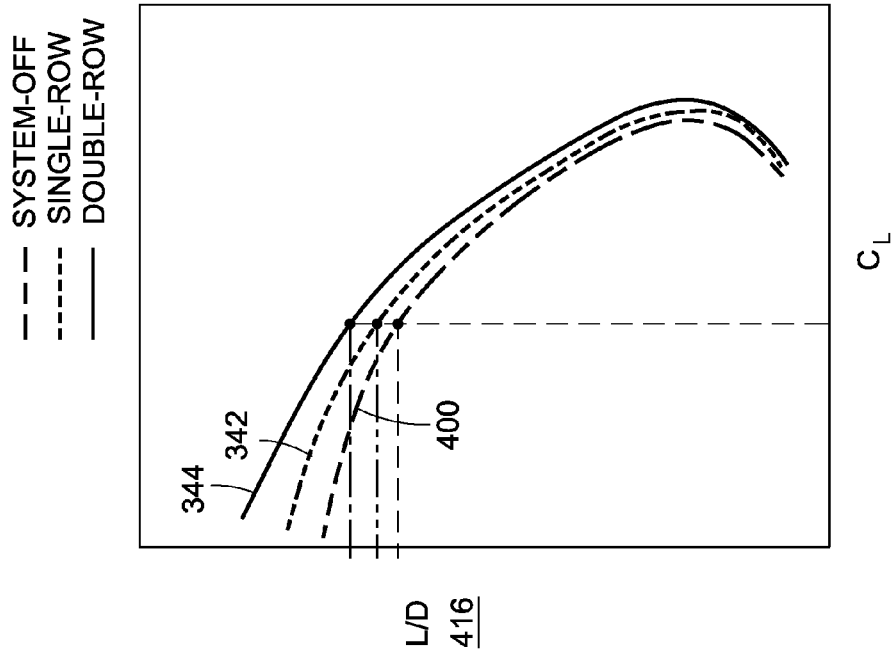
FIG. 49 is a plot of lift-to-drag ratio (L/D) vs. lift coefficient ($C_L$) for the system-off configuration of FIG. 30, the single-row configuration of FIG. 31, and the double-row configuration of FIG. 32.

FIG. 49 is a plot of lift-to-drag ratio (L/D) 416 vs. lift coefficient ($C_L$) 410 for the aircraft wing 144 in the system-off configuration 400 shown in FIGS. 18 and 21, the single-row configuration 342 shown in FIGS. 19 and 22, and the double-row configuration 344 shown in FIGS. 20 and 23. As indicated above, the long-dashed curve represents the system-off configuration 400, the short-dashed curve represents the system-on single-row configuration 342, and the solid curve represents the system-on double-row configuration 344. The vertical dashed line in FIG. 49 represents the $C_L$ for the system-off configuration 400 at an α of 10° and the horizontal dashed line is the corresponding L/D. FIG. 49 illustrates the improvements in L/D provided by the single-row configuration 342 and the double-row configuration 344 relative to the L/D of the system-off configuration of the wing 144 in the takeoff configuration.

FIGS. 50-52 illustrate a further example of a plurality of air ejectors 300 arranged in clusters 346 and distributed along a spanwise direction 150 of an aft portion 130 of the wing 144. FIG. 50 is a perspective view of an aft portion 130 of an aircraft wing 144 with the trailing edge devices removed to show the clusters 346 of air ejectors 300 arranged in a double-row configuration 344. FIG. 51 is a top view of the aircraft wing 144 of FIG. 51 showing the spanwise distribution of air ejectors 300 arranged in clusters 346. FIG. 52 is an end view of the aft portion 130 of the aircraft wing 144 showing the clusters 346 of air ejectors 300 in the double-row configuration 344.

In the present disclosure, a cluster 346 may include any number of air ejectors 300. For example, FIGS. 50 to 52 show six sets of clusters 346 including clusters with five (5) air ejectors 300 and clusters with four (4) or fewer air ejectors 300. In this regard, a cluster 346 may include any number of air ejectors 300. The clusters 346 may be locally positioned to achieve a specific mission objective or the clusters 346 may be uniformly distributed along any spanwise segment of an airfoil 120. In addition, although shown in a double-row configuration 344, clusters 346 of air ejectors 300 may be provided in a single-row configuration 342 or in arrangements with more than two rows of air ejectors 300.

FIGS. 53-55 illustrate an example of a plurality of air ejectors 300 arranged in a staggered layout of clusters 346 and distributed in a double-row configuration 344. FIG. 53 is a perspective view of an aft portion 130 of the wing 144 with the trailing edge devices removed to show the staggered clusters 346 of air ejectors 300 arranged in the double-row configuration 344. FIG. 54 is a top view of the aircraft wing 144 of FIG. 53 illustrating the spanwise distribution of clusters 346 of the air ejectors 300. FIG. 55 is an end view of the aft portion 130 of the aircraft wing 144 showing the staggered clusters 346 of air ejectors 300.

FIGS. 56-58 illustrate an example of locally positioned clusters 346 of air ejectors 300. FIG. 56 is a perspective view of an aft portion 130 of the aircraft 100 with the trailing edge devices 200 removed to show localized clusters 346 of air ejectors 300 arranged in a double-row configuration 344. FIG. 57 is a top view of the aircraft wing 144 of FIG. 56 illustrating the localized clusters 346 of air ejectors 300.

FIG. 58 is an end view of the aft portion 130 of the aircraft wing 144 and illustrating the localized clusters 346 of air ejectors 300.

As indicated above, the air ejector quantity and placement may be dictated by mission objectives and flight conditions. In addition, the air ejector quantity and placement may be exploited to manage aerodynamic loading of the wing 144. For example, a spanwise array 340 of air ejectors 300 may include a first set 348 (FIG. 53) of air ejectors 300 and a second set 350 (FIG. 53) of air ejectors 300 which may be located outboard of the first set 348. The first set 348 of air ejectors 300 may be configured to discharge air jets 322 at different times than the discharge of air jets 322 by the second set 350 as a means to vary the spanwise aerodynamic loading on a wing 144. In one example, during takeoff, the activation of the air ejectors 300 may be managed to more closely approximate an elliptical span load distribution to ensure a relatively low level of induced drag which may further improve the L/D.

Figure 60:
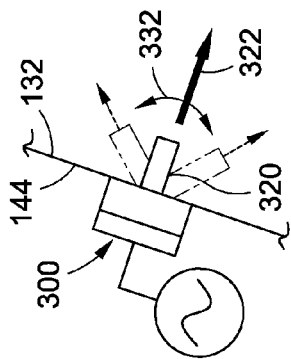
FIG. 60 is a diagrammatic representation of a magnified view of one of the oscillating nozzles encircled by dashed line identified by reference numeral 60 of FIG. 59.
Figure 59:
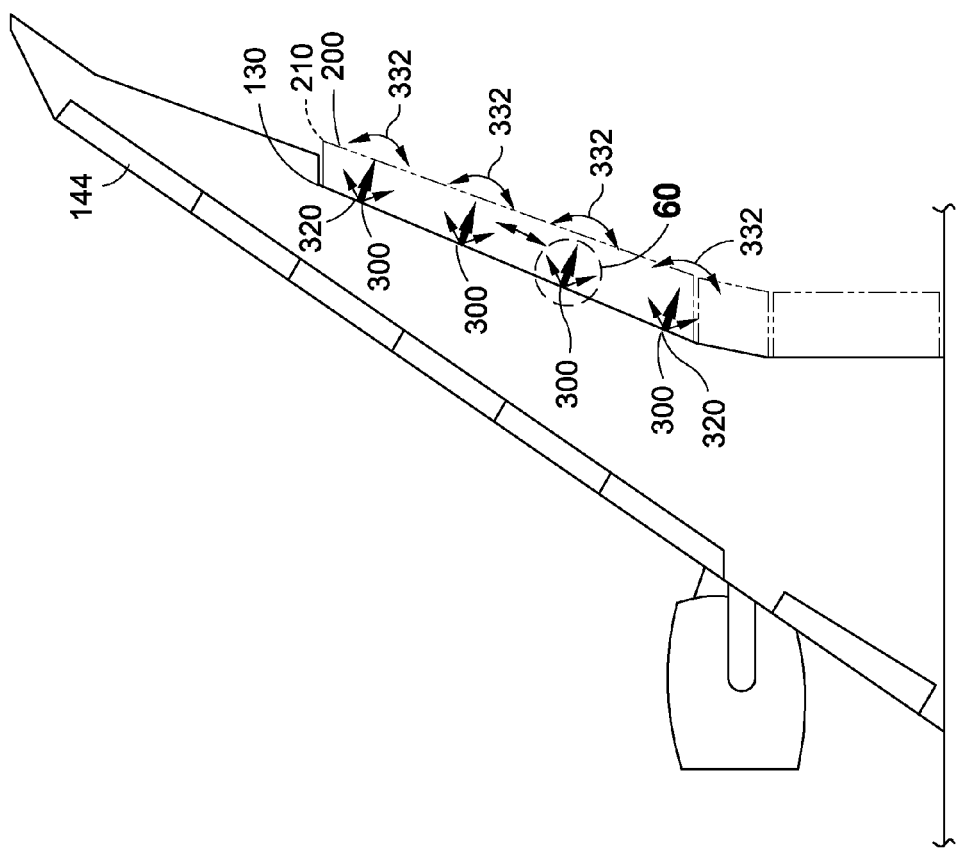
FIG. 59 is a diagrammatic representation of a top view of an aircraft wing with clusters of air ejectors having nozzles configured to oscillate in a lateral direction.

FIG. 59 is a top view of an aircraft wing 144 including one or more air ejectors 300 having an ejection port 318 configured as a nozzle 320 having the capability to oscillate. FIG. 60 is a magnified view of one of the oscillating nozzles 320. In some examples, a nozzle 320 may be mounted to the rear spar 132 of the wing 144 and may be configured to oscillate in a lateral direction 332 (e.g., a lateral back-and-forth motion) in a manner causing the air jet 322 to laterally sweep back-and-forth along a spanwise portion of a trailing edge device 200 (FIG. 59). The lateral sweeping of the air jet 322 may energize the ambient flow 158 (FIG. 5) and streamline the ambient flow 158 over the wing 144 and trailing edge device 200. Although not shown, one or more of the air ejectors 300 may be configured as a fluidic oscillator as known in the art and which may discharge an air jet 322 in a laterally oscillating manner causing the air jet 322 to laterally sweep along a spanwise portion of a trailing edge device 200.

Figure 61:
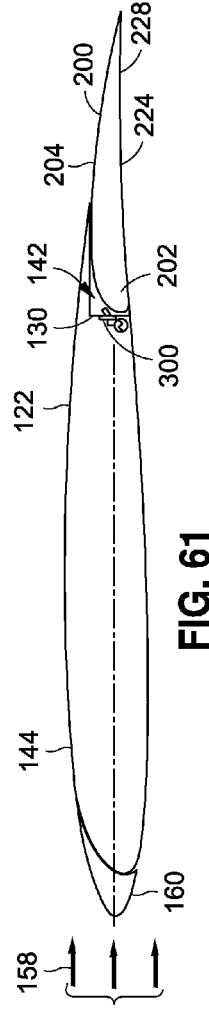
FIG. 61 is a diagrammatic representation of a sectional view of an aircraft wing having a trailing edge device configured as a single Fowler flap shown in a retracted position.
Figure 62:
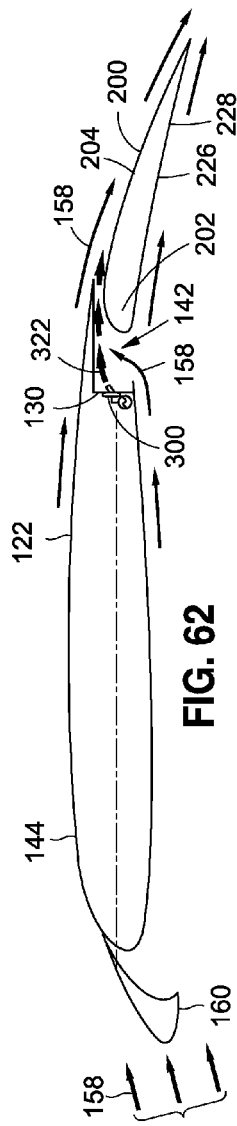
FIG. 62 is a diagrammatic representation of a sectional view of the aircraft wing of FIG. 61 and showing an air ejector discharging an air jet during deployment of the single Fowler flap.

FIG. 61 is a sectional view of an aircraft wing 144 having a trailing edge device 200 configured as a single Fowler flap 230 shown in a retracted position 224. The Fowler flap may move aftwardly while rotating downwardly when deployed. FIG. 62 shows the aircraft wing 144 of FIG. 61 with the single Fowler flap 230 in a deployed position 226. The air ejector 300 is shown discharging an air jet 322 into the main cove 142 between the aft portion 130 of the wing 144 and the forward portion 202 of the Fowler flap 230 for energizing and streamlining the ambient flow 158 over the flap 230.

Figure 63:
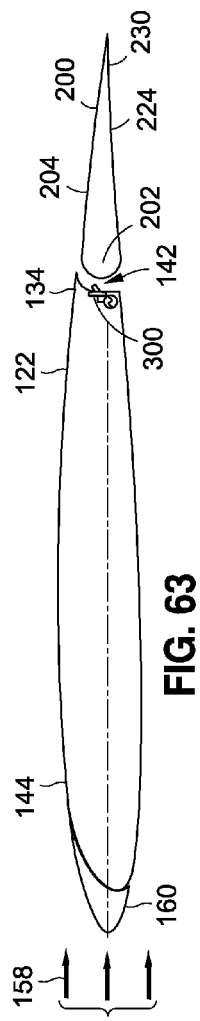
FIG. 63 is a diagrammatic representation of a sectional view of an aircraft wing having a trailing edge device configured as a simple flap shown in a retracted position.
Figure 64:
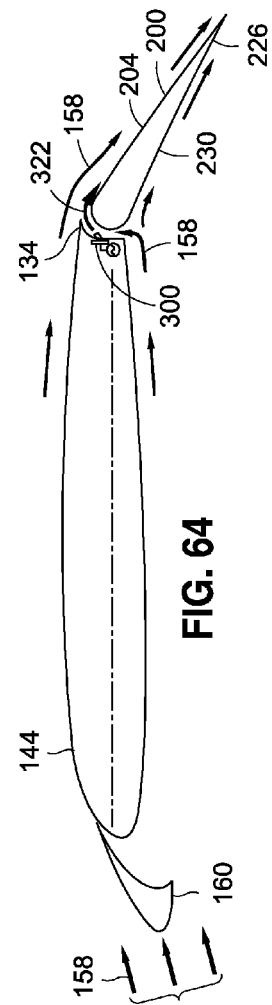
FIG. 64 is a diagrammatic representation of a sectional view of the aircraft wing of FIG. 63 and showing an air ejector discharging an air jet during deployment of the simple flap.

FIG. 63 is a sectional view of an aircraft wing 144 having a trailing edge device 200 configured as a simple flap 232 shown in a retracted position 224. The simple flap 232 may pivot about a fixed pivot point relative to the wing main element 122. The wing main element 122 may include an overhang 134 which may redirect the ambient flow 158 over the upper surface 204 of the simple flap 232. FIG. 64 shows the aircraft wing 144 of FIG. 63 with an air ejector 300 discharging an air jet 322 during deployment of the simple flap 232, and resulting in the energizing and streamlining of the ambient flow 158 over the upper surface 204 of the simple flap 232.

Figure 65:
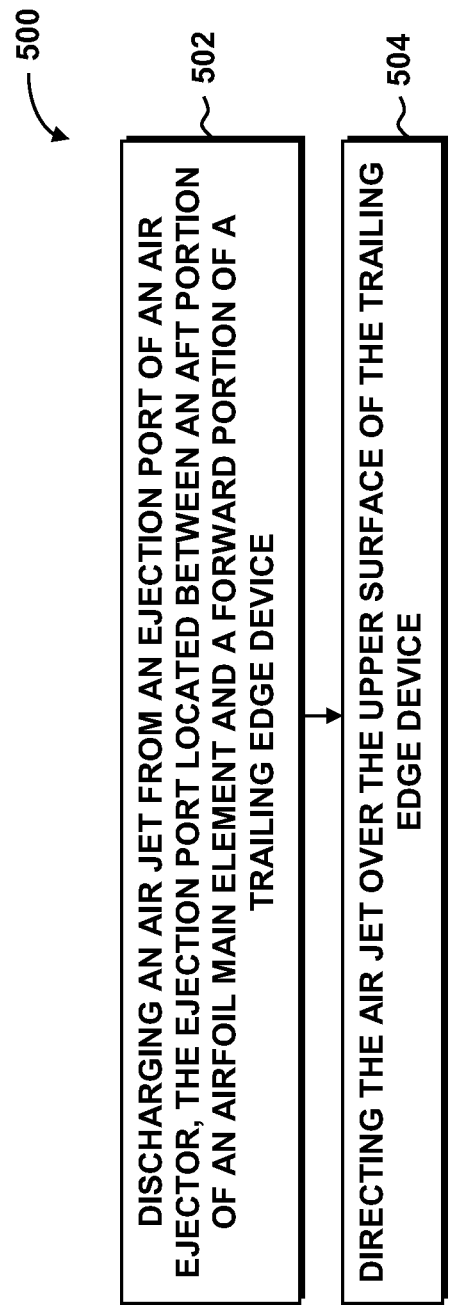
FIG. 65 is a flowchart illustrating one or more operations that may be included in a method of reducing aerodynamic drag of an airfoil.

FIG. 65 is a flowchart illustrating one or more operations that may be included in a method 500 of reducing aerodynamic drag of an airfoil 120. Step 502 of the method 500 may include discharging an air jet 322 from an ejection port 318 of an air ejector 300. As indicated above, one or more air ejectors 300 may include ejection ports 318 located between the aft portion 130 of the airfoil main element 122 and the forward portion 202 of the trailing edge device 200. For example, air jets 322 may be discharged from the ejection ports 318 that may be mounted on the rear spar 132 of a wing 144. In one example, the ejection ports 318 may non-exposed to ambient flow 158 over the airfoil 120 when the trailing edge devices 200 in a retracted position 224.

The step of discharging the air jet 322 may include at least partially deploying a trailing edge device 200 from a retracted position 224 to a deployed position 226. When the trailing edge device 200 is moved from a retracted position 224 to a deployed position 226, the method may include discharging the air jet 322 when the trailing edge device 200 is deployed and the ambient flow 158 flows from a lower surface 126 of the airfoil main element 122 and passes upwardly into and through the main cove 142. The air jet 322 may mix with the ambient flow 158 which may pass over an upper surface 204 of the trailing edge device 200. The step of discharging the air jet 322 may include discharging the air jet 322 in an upward direction 324 relative to the chord line 156 of the airfoil 120, as described above. The step of discharging the air jet 322 may also include discharging the air jet 322 in an outboard direction 328 relative to a longitudinal axis 106 of the aircraft 100, as mentioned above.

Step 504 of the method 500 may include directing the air jets 322 in such a manner to cause the air jets 322 to pass over the upper surface 204 of the trailing edge device 200. In some examples, the airfoil main element 122 may include the above-mentioned overhang 134 such as an aft portion 130 of a spoiler 228 in a retracted state. The method may include discharging the air jet 322 toward an underside 136 of the overhang 134 in such a manner that the air jet 322 impinges on the underside 136 of the overlap, and is deflected or directed toward a spanwise gap 140 between the overhang 134 and the upper surface 204 of the trailing edge device 200 and facilitating the flow of air over the contour of the upper surface 204 of the trailing edge device 200.

In other examples, the method may include oscillating air jets using fluidic oscillators (not shown) as mentioned above, or by oscillating a nozzle 320 (e.g., FIG. 61) of one or more air ejectors 300 in a lateral direction 332 (e.g., back-and-forth motion) when discharging the air jet 322. A fluidic oscillator (not shown) or an oscillating nozzle 320 (FIG. 61) may result in lateral sweeping of the air jet 322 back-and-forth along a spanwise portion of the trailing edge device 200 in response to oscillating the nozzle 320. Also indicated above, the lateral sweeping of the air jet 322 may energize and streamline the ambient flow 158 along a spanwise segment of the trailing edge device 200.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A drag reduction system for an airfoil, comprising:
   an air ejector having an ejection port mounted on or extending aftwardly from an aft portion of an airfoil main element of the airfoil, the ejection port terminating within a main cove having side boundaries defined by the aft portion of the airfoil main element and a forward portion of a trailing edge device and an upper boundary defined by an overhang extending from the aft portion of the airfoil main element, the election port terminating at a location below the overhang; and the air ejector configured to discharge an air jet from the ejection port in such a manner that the air jet is discharged into the main cove and mixes with ambient flow flowing upwardly into the main cove from a lowermost surface of the airfoil at an entrainment point located aft of the ejection port before passing out of the main cove and into ambient flow passing over an upper surface of the trailing edge device.

2. The system of claim 1, wherein:
the air ejector is configured to discharge the air jet when the trailing edge device is deployed.

3. The system of claim 1, wherein:
the ejection port is configured to discharge the air jet in at least one of an upward direction relative to a chord line of the airfoil of an aircraft and an outboard direction relative to a longitudinal axis of the aircraft.

4. The system of claim 1, wherein:
the airfoil is a wing having a rear spar; and
the ejection port being mounted to the rear spar.

5. The system of claim 1, wherein:
the air ejector is configured as a fluidic oscillator; and
the fluidic oscillator discharging an air jet in a manner causing the air jet to laterally sweep back-and-forth along a spanwise portion of the trailing edge device.

6. The system of claim 1, wherein:
the air ejector comprises a plurality of air ejectors.

7. The system of claim 6, wherein:
the plurality of air ejectors are arranged in a spanwise array.

8. The system of claim 6, wherein:
the plurality of air ejectors are arranged in clusters.

9. The system of claim 6, wherein:
the plurality of air ejectors are arranged in two or more rows.

10. The system of claim 1, wherein:
the trailing edge device is one of a flap, a flaperon, an aileron, and an elevon.

11. The system of claim 1, wherein:
the trailing edge device is a multi-slotted flap.

12. The system of claim 1, wherein:
the air ejector is configured as one of a zero-net-mass-flux jet and a pneumatic air ejector.

13. A drag reduction system for a wing, comprising:
an air ejector having an ejection port mounted on or extending aftwardly from a rear spar of the wing, the ejection port terminating within a main cove having side boundaries defined by the rear spar and a forward portion of a flap and an upper boundary defined by an overhang extending from the rear spar, the election port terminating at a location below the overhang; and
the air ejector is configured to discharge an air jet from the ejection port in such a manner that the air jet is discharged into the main cove and mixes with ambient flow flowing upwardly into the main cove from a lowermost surface of the wing at an entrainment point located aft of the ejection port when the flap is deployed before passing out of the main cove and into ambient flow passing over an upper surface of the flap.

14. A method of reducing aerodynamic drag of an airfoil, comprising:
discharging an air jet from an ejection port of an air ejector, the ejection port being mounted on or extending aftwardly from an aft portion of an airfoil main element of the airfoil, the ejection port terminating within a main cove having side boundaries defined by the aft portion of the airfoil main element and a forward portion of a trailing edge device and an upper boundary defined by an overhang extending from the aft portion of the airfoil main element, the ejection port terminating at a location below the overhang; and
directing the air jet from the ejection port into the main cove in such a manner to cause the air jet to mix with ambient flow flowing upwardly into the main cove from a lowermost surface of the airfoil at an entrainment point located aft of the ejection port before passing out of the main cove and into ambient flow passing over an upper surface of the trailing edge device.

15. The method of claim 14, wherein the step of discharging the air jet includes:
at least partially deploying the trailing edge device; and
discharging the air jet when the trailing edge device is at least partially deployed.

16. The method of claim 14, wherein the step of discharging the air jet includes:
discharging the air jet in at least one of an upward direction relative to a chord line of the airfoil of an aircraft and an outboard direction relative to a longitudinal axis of the aircraft.

17. The method of claim 14, wherein the step of discharging the air jet includes:
laterally sweeping the air jet in a back-and-forth manner along a spanwise portion of the trailing edge device.

18. The method of claim 14, wherein:
the air ejector comprises a plurality of air ejectors.

19. The method of claim 18, wherein:
the plurality of air ejectors are arranged in clusters of air ejectors.

20. The method of claim 18, wherein:
the plurality of air ejectors are arranged in two or more rows extending along a spanwise direction.

* * * * *